United States Patent
Wu et al.

(10) Patent No.: US 12,356,448 B2
(45) Date of Patent: Jul. 8, 2025

(54) OVERHEAD REDUCTION FOR HIGH-RESOLUTION MULTI-TRANSMISSION-RECEPTION POINT (MULT-TRP) PRECODING MATRIX INDICATION (PMI)

(71) Applicant: QUALCOMM Incorporated, San Diego, CA (US)

(72) Inventors: Liangming Wu, Beijing (CN); Chenxi Hao, Beijing (CN); Yu Zhang, San Diego, CA (US); Chao Wei, Beijing (CN); Qiaoyu Li, Beijing (CN); Min Huang, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 17/759,969

(22) PCT Filed: Feb. 13, 2020

(86) PCT No.: PCT/CN2020/075042
§ 371 (c)(1),
(2) Date: Aug. 2, 2022

(87) PCT Pub. No.: WO2021/159376
PCT Pub. Date: Aug. 19, 2021

(65) Prior Publication Data
US 2023/0062132 A1 Mar. 2, 2023

(51) Int. Cl.
*H04L 12/00* (2006.01)
*H04W 72/23* (2023.01)
*H04W 74/0808* (2024.01)

(52) U.S. Cl.
CPC ....... *H04W 74/0808* (2013.01); *H04W 72/23* (2023.01)

(58) Field of Classification Search
CPC .............. H04W 74/0808; H04W 72/23; H04B 7/0695; H04B 7/024; H04B 7/0639; H04B 7/0645; H04L 5/0035; H04L 5/0057

(Continued)

(56) References Cited

U.S. PATENT DOCUMENTS

| | | | |
|---|---|---|---|
| 2019/0160448 A1* | 5/2019 | Bischof | B01J 19/1843 |
| 2019/0260448 A1* | 8/2019 | Rahman | H04B 7/0626 |
| 2019/0349033 A1 | 11/2019 | Fakoorian et al. | |

FOREIGN PATENT DOCUMENTS

| | | |
|---|---|---|
| CN | 109391404 A | 2/2019 |
| CN | 110635883 A | 12/2019 |

(Continued)

OTHER PUBLICATIONS

International Search Report and Written Opinion—PCT/CN2020/075042—ISA/EPO—Nov. 11, 2020.

(Continued)

*Primary Examiner* — Frantz Coby
(74) *Attorney, Agent, or Firm* — Haynes and Boone, LLP

(57) ABSTRACT

Wireless communications systems and methods related to multi-transmission-reception point (multi-TRP) precoding matrix indication (PMI) operations are provided. A user equipment (UE) receives a configuration indicating a precoder size parameter for a plurality of transmission-reception points (TRPs). The UE receives, from a first TRP of the plurality of TRPs, a first reference signal. The UE receives, from a second TRP of the plurality of TRPs, a second reference signal, the second TRP being different from first TRP. The UE transmits, to the first TRP or the second TRP, a channel state information (CSI) report including a first feedback component based on the first reference signal and a second feedback component based on the second reference signal, where a combined payload size of the first feedback (Continued)

component and the second feedback component is based on the precoder size parameter.

27 Claims, 11 Drawing Sheets

(58) Field of Classification Search
USPC .......................................................... 370/329
See application file for complete search history.

(56) References Cited

FOREIGN PATENT DOCUMENTS

| CN | 115088328 A | * | 9/2022 | ............ H04B 7/024 |
|---|---|---|---|---|
| WO | 2018226581 A1 | | 12/2018 | |
| WO | 2020006755 A1 | | 1/2020 | |
| WO | WO-2023174551 A1 | * | 9/2023 | ............ H04B 7/024 |
| WO | WO-2024102560 A1 | * | 5/2024 | ........... H04B 7/0465 |

OTHER PUBLICATIONS

Supplementary European Search Report—EP20918580—Search Authority—Munich—Jan. 29, 2024.

\* cited by examiner

OVERHEAD REDUCTION FOR HIGH-RESOLUTION MULTI-TRANSMISSION-RECEPTION POINT (MULT-TRP) PRECODING MATRIX INDICATION (PMI)

CROSS-REFERENCE TO RELATED APPLICATIONS

The present application is a 35 U.S.C. 371 National Phase entry of Patent Cooperation Treaty (PCT) Application No. PCT/CN2020/075042, filed Feb. 13, 2020. The aforementioned application is hereby expressly incorporated herein by reference in its entirety.

TECHNICAL FIELD

The technology described below relates generally to wireless communication systems, and more particularly to multi-transmission-reception point (multi-TRP) precoding matrix indication (PMI) operations. Certain embodiments can enable and provide techniques allowing communication devices (e.g., user equipment devices or base stations) to efficiently report high-resolution PMI for multiple TRPs in a combined report (e.g., with a minimal overhead).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR is also designed to enhance channel capacity by utilizing advanced massive multiple-input multiple-output (MIMO) and beamforming technologies. The benefit of MIMO may rely on a transmitter having accurate (e.g., high-resolution) channel state information (CSI) so that the transmitter may form high-quality transmission beams for communication with a respective receiver. One approach to facilitating a transmitter in forming high-quality transmission beams is for a respective receiver to feedback high-resolution CSI to the transmitter.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure provide mechanisms and techniques to enable efficient multi-transmission-reception-point (multi-TRP) channel state information (CSI) reporting with high-resolution precoding matrix indication (PMI). In certain deployments, a network may communicate with a user equipment (UE) via multiple TRPs. The multiple TRPs may transmit reference signals to facilitate precoder parameter selection at the UE and the UE may feedback the PMI for each TRP based on a precoder parameter selection. The network may control the amount of information or payload size that the UE may use to report PMI for all the TRP in a combined report. A PMI feedback for each TRP may include a selection of spatial domain components, a selection of frequency domain components, and precoding matrix coefficients. The network may configure the UE with a threshold associated with at least one of a quantity of spatial domain components, a quantity of frequency domain components, a parameter associated with a quantity of coefficients, or a quantization level for the precoding matrix coefficients.

For example, in an aspect of the disclosure, a method of wireless communication includes receiving, by a user equipment (UE), a configuration indicating a precoder size parameter for a plurality of transmission-reception points (TRPs). The method may also include receiving, by the UE from a first TRP of the plurality of TRPs, a first reference signal. The method may also include receiving, by the UE from a second TRP of the plurality of TRPs, a second reference signal, the second TRP being different from first TRP. The method may also include transmitting, by the UE to the first TRP or the second TRP, a channel state information (CSI) report including a first feedback component based on the first reference signal and a second feedback component based on the second reference signal, where a combined payload size of the first feedback component and the second feedback component is based on the precoder size parameter.

In an additional aspect of the disclosure, a method of wireless communication includes including transmitting, by a base station (BS), a configuration indicating a precoder size parameter for a plurality of transmission-reception points (TRPs). The method may also include transmitting, by the BS via a first TRP of the plurality of TRPs, a first reference signal. The method may also include transmitting, by the BS via a second TRP of the plurality of TRPs, a second reference signal, the second TRP being different from first TRP. The method may also include receiving, by the BS, a channel state information (CSI) report including a first feedback component based on the first reference signal and a second feedback component based on the second reference signal, where a combined payload size of the first feedback component and the second feedback component is based on the precoder size parameter.

In an additional aspect of the disclosure, a user equipment (UE) includes a transceiver configured to receive a configuration indicating a precoder size parameter for a plurality of transmission-reception points (TRPs). The transceiver may also be configured to receive, from a first TRP of the plurality of TRPs, a first reference signal. The transceiver may also be configured to receive, from a second TRP of the plurality of TRPs, a second reference signal, the second TRP being different from first TRP. The transceiver may also be configured to and transmit, to the first TRP or the second TRP, a channel state information (CSI) report including a first feedback component based on the first reference signal and a second feedback component based on the second reference signal, where a combined payload size of the first feedback component and the second feedback component is based on the precoder size parameter.

In an additional aspect of the disclosure, a base station (BS) includes a transceiver configured to transmit a configuration indicating a precoder size parameter for a plurality of transmission-reception points (TRPs). The transceiver may also be configured to transmit, via a first TRP of the plurality of TRPs, a first reference signal. The transceiver may also be configured to transmit, via a second TRP of the plurality of TRPs, a second reference signal, the second TRP being different from first TRP. The transceiver may also be configured to receive a channel state information (CSI) report including a first feedback component based on the first reference signal and a second feedback component based on the second reference signal, where a combined payload size of the first feedback component and the second feedback component is based on the precoder size parameter.

In an additional aspect of the disclosure, a non-transitory computer-readable medium having program code recorded thereon, the program code including code for causing a user equipment (UE) to receive a configuration indicating a precoder size parameter for a plurality of transmission-reception points (TRPs). The program code may also include code for causing the UE to receive, from a first TRP of the plurality of TRPs, a first reference signal; code for causing the UE to receive, from a second TRP of the plurality of TRPs, a second reference signal, the second TRP being different from first TRP. The program code may also include code for causing the UE to transmit, to the first TRP or the second TRP, a channel state information (CSI) report including a first feedback component based on the first reference signal and a second feedback component based on the second reference signal, where a combined payload size of the first feedback component and the second feedback component is based on the precoder size parameter.

In an additional aspect of the disclosure, a non-transitory computer-readable medium having program code recorded thereon, the program code including code for causing a base station (BS) to transmit a configuration indicating a precoder size parameter for a plurality of transmission-reception points (TRPs). The program code may also include code for causing the BS to transmit, via a first TRP of the plurality of TRPs, a first reference signal. The program code may also include code for causing the BS to transmit, via a second TRP of the plurality of TRPs, a second reference signal, the second TRP being different from first TRP. The program code may also include code for causing the BS to receive a channel state information (CSI) report including a first feedback component based on the first reference signal and a second feedback component based on the second reference signal, where a combined payload size of the first feedback component and the second feedback component is based on the precoder size parameter.

In an additional aspect of the disclosure, a user equipment (UE) includes means for receiving a configuration indicating a precoder size parameter for a plurality of transmission-reception points (TRPs). The UE may also include means for receiving, from a first TRP of the plurality of TRPs, a first reference signal. The UE may also include means for receiving, from a second TRP of the plurality of TRPs, a second reference signal, the second TRP being different from first TRP. The UE may also include means for transmitting, to the first TRP or the second TRP, a channel state information (CSI) report including a first feedback component based on the first reference signal and a second feedback component based on the second reference signal, where a combined payload size of the first feedback component and the second feedback component is based on the precoder size parameter.

In an additional aspect of the disclosure, a base station (BS) includes means for transmitting a configuration indicating a precoder size parameter for a plurality of transmission-reception points (TRPs). The BS may also include means for transmitting, via a first TRP of the plurality of TRPs, a first reference signal. The BS may also include means for transmitting, via a second TRP of the plurality of TRPs, a second reference signal, the second TRP being different from first TRP. The BS may also include means for receiving a channel state information (CSI) report including a first feedback component based on the first reference signal and a second feedback component based on the second reference signal, where a combined payload size of the first feedback component and the second feedback component is based on the precoder size parameter.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
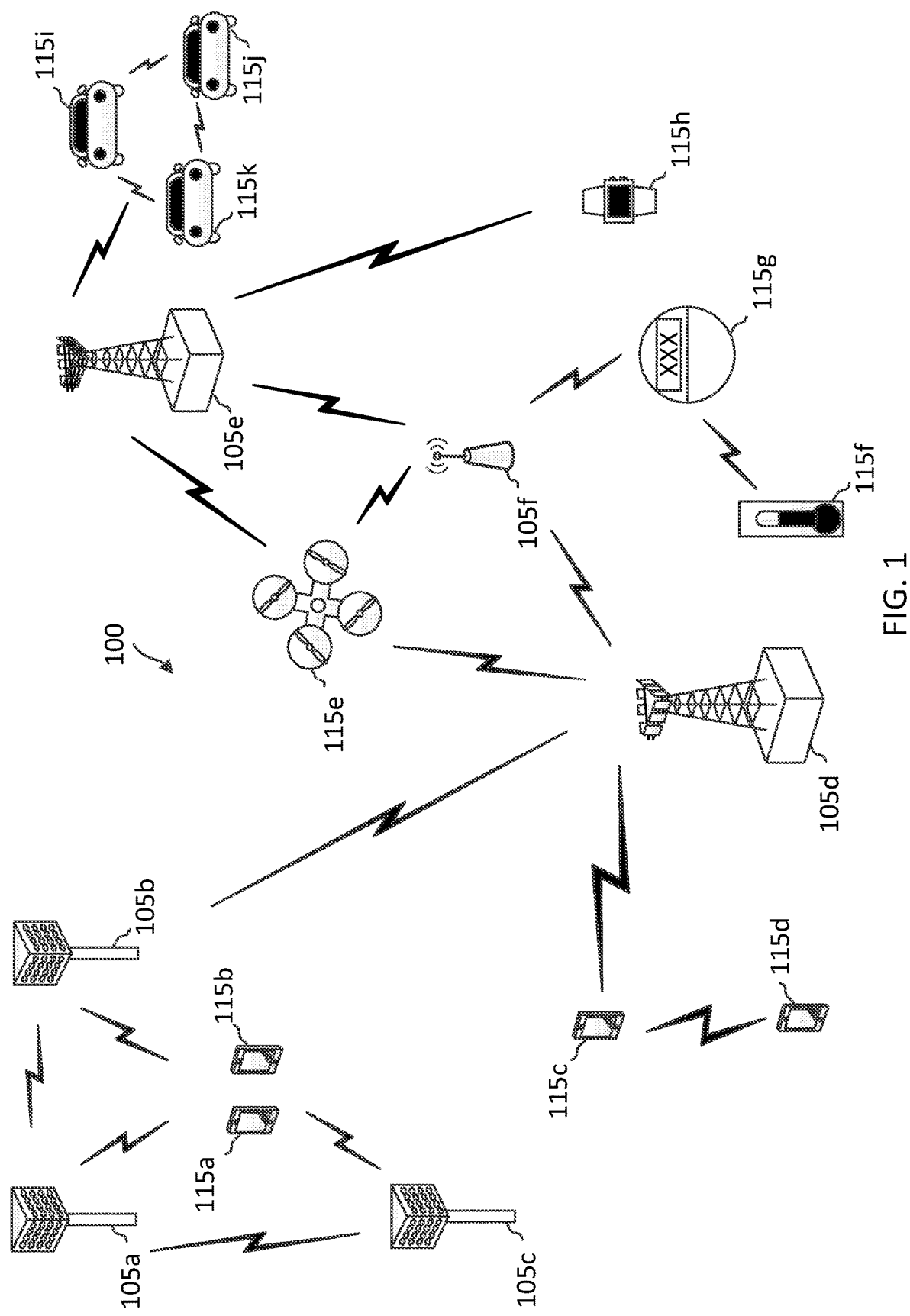
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In wireless communications, channel state information (CSI) may refer to known channel properties of a communication link. The CSI may represent how a signal may propagate over-the-air from a transmitter to a receiver. The CSI may represent the combined channel effects of, for example, scattering, fading, and/or power decay with distance between the transmitter and the receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at a receiver, quantized, and fed back to a transmitter. CSI may include various feedback information, such as rank indicator (RI), channel quality indicator (CQI), and/or precoding matrix indicator (PMI).

PMI may include a wideband precoding matrix and a frequency-selective subband precoding matrix. The wideband precoding matrix and the frequency-selective subband precoding matrix may be represented in the form of one or more codebooks, which may be utilized by a transmitter for precoding. Precoding may refer to the formation of beam(s) with a certain directivity (angular direction) and transmit power at a transmitter by weighting signal phases and amplitudes of antennas or antenna elements at the transmitter.

A wireless communication system may utilize multiple transmission-reception-points (TRPs) to communicate with a use equipment (UE), for example, to improve reliability, coverage, and/or capacity performance. Each of the TRPs may apply precoding for transmissions. Accordingly, the UE may feedback CSI for each TRP so that each TRP may perform appropriate precoding to form beams for communication with the UE. However, the overhead of transmitting high-resolution CSI feedbacks for each TRP can be significant.

Various mechanisms and techniques for efficiently reporting multi-TRP CSI with high-resolution PMI are described herein. In certain deployments, a network may communicate with a UE via multiple TRPs. The multiple TRPs may transmit reference signals to facilitate precoder parameter selection at the UE and the UE may feedback the PMI for each TRP based on precoder parameter selection. The network may control the amount of information or payload size that the UE may use to report PMI for all the TRP in a combined report. A PMI feedback for each TRP may include a selection of spatial domain basis, a selection of frequency domain basis, and precoding matrix coefficients. The network may configure a threshold for a quantity of spatial domain basis that the UE may report for each TRP or a threshold for a combined quantity of spatial domain basis the UE may report for all TRP. Additionally or alternatively, the network may configure a threshold for a quantity of frequency domain basis that the UE may report for each TRP or a threshold for a combined quantity of frequency domain basis the UE may report for all TRPs. Additionally or alternatively, the network may configure a threshold for a quantity of precoding matrix coefficients that the UE may report for each TRP or a threshold for a combined quantity of precoding matrix coefficients the UE may report for all TRPs. Additionally or alternatively, the network may configure a threshold for a quantity of per-coefficient quantization bits that the UE may use for each TRP or a threshold for a combined quantity of per-coefficient quantization bits that the UE may use for all TRPs.

Aspects of the present disclosure can provide several benefits. For example, controlling a quantity of spatial domain basis, a quantity of frequency domain basis, a quantity of precoding matrix coefficients, and/or a quantity of per coefficient quantization bits that a UE may use for reporting a combined CSI report for multiple TRPs can allow the UE to report high-resolution PMI with a minimal CSI report payload overhead increase. Feeding back high-resolution PMI for each TRP allows each TRP to form high-quality beams for communication with the UE. The disclosed embodiments allow the UE to feedback, in a single transmission, a multi-TRP CSI report with high-resolution PMI for all TRPs in communication with the UE or a subset of the TRPs in communication with the UE.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK (e.g., in a PUCCH) to the BS 105. Conversely, if the UE 115 fails to receive the DL transmission successfully, the UE 115 may transmit a HARQ NACK (e.g., in a PUCCH) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the BS 105 and the UE 115 may communicate with each other by utilizing MIMO and beamforming techniques. For instance, the BS 105 may transmit reference signals to the UE 115. The reference signals may be referred to as CSI-RSs and include predetermined pilot symbols so that the UE 115 may estimate a DL channel between the BS 105 and the UE 115. To facilitate beamforming at the BS 105, the UE 115 may feedback CSI (e.g., estimate of the DL channel) to the BS 105. In some aspects, the BS 105 may perform precoding to generate transmission beams with a certain directivity and/or a certain transmit power. The precoding process may include weighting signal phases and/or signal amplitudes at antenna elements of the BS 105. To facilitate the precoding process, the UE 115 may include PMI in the CSI feedback. The PMI may include information associated with a wideband precoding matrix and a frequency-selective subband precoding matrix as will be discussed in greater detail below.

In some aspects, the network 100 may utilize multiple TRPs to communicate with a UE 115, for example, to increase reliability, coverage, and/or capacity performance. For instance, a BS 105 may be coupled to multiple TRPs and may communicate with a UE 115 via the multiple TRPs. As similarly discussed above, the multiple TRPs may also apply MIMO and beamforming techniques to communicate with the UE 115 and the UE 115 may feedback CSI for each of the TRPs. Mechanisms for reporting CSI for multiple TRPs are described in greater detail herein.

Figure 2:
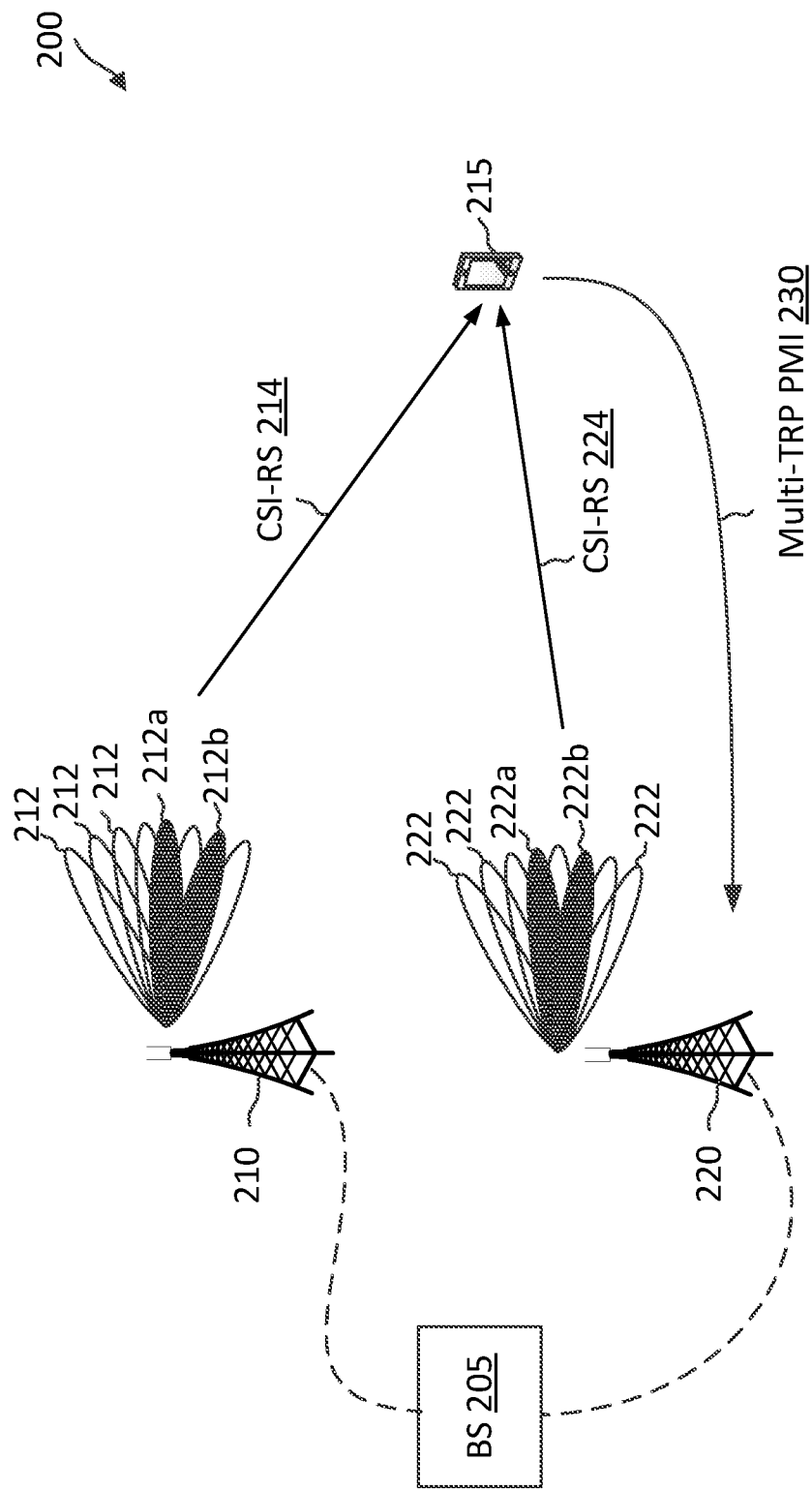
FIG. 2 illustrates a wireless communication network that implements multi-transmission-reception point (TRP) channel state information (CSI) reporting according to some aspects of the present disclosure.

FIG. 2 illustrates a wireless communication network 200 that implements multi-TRP CSI reporting according to some aspects of the present disclosure. The network 200 may correspond to a portion of the network 100. FIG. 2 illustrates two TRPs 210 and 220 in communication with one UE 215 for purposes of simplicity of discussion, though it will be recognized that embodiments of the present disclosure may scale to many more UEs 215 and/or TRPs 210 and 220. The UE 215 may be similar to the UEs 115. Each of the TRPs 210 and 220 may include a radio frequency (RF) frontend configured for wireless signal transmissions and receptions. The TRPs 210 and 220 may be coupled to a BS 205 similar to the BSs 105. In some instances, the TRPs 210 and/or 220 may be co-located with the BS 205. In some other instances, the TRPs 210 and/or 220 may be located at a remote location. In some instances, the TRPs 210 and/or 220 may have similar functionalities as a BS 105. For instance, certain BS operations, such as baseband processing and/or protocol processing, may be distributed to the TRPs 210 and/or 220. In some other instances, the baseband processing and/or protocol processing may be centralized at the BS 205.

In some aspects, each of the TRPs 210 and 220 and the UE 215 may have an array of antenna elements and may apply beamforming techniques to communicate with each other. The antenna array may be in the form of a single panel or multiple panels. Each antenna panel may include a plurality of antenna ports or elements in a vertical dimension and a plurality of antenna ports or elements in a horizontal dimension. In some examples, the TRPs 210 and 220 may each have multi-panel antennas and the UE 215 may have a single-panel antenna. In some other examples, the TRP 210, the TRP 220, and the UE 215 may each have multi-panel antennas. In the illustrated example of FIG. 2, the TRP 210 may form beams 212 in an array of angular directions by weighting signal phases and amplitudes at the antenna elements. Similarly, the TRP 220 may form beams 222 in an array of angular directions. Each of the TRPs 210 and 220 may utilize the best beam to communicate with the UE 215. The best beam may refer to a high-quality beam, for example, where the beam may have a highest received signal power among a set of beams measured at the UE 215.

To facilitate the UE 215 in selecting the best beam(s) 212 from the TRP 210 and the best beam(s) 222 from the TRP 220, the TRP 210 may transmit CSI-RS 214 using one or more beams 212 and the TRP 220 may transmit CSI-RS 224 using one or more beams 222. Each of the CSI-RSs 214 and 224 may include a predetermined sequence or a sequence of predetermined pilot symbols. The TRP 210 may transmit the CSI-RS 214 at configured time and frequency locations and use one or more configured beams 212. Additionally, the TRP 210 may transmit the CSI-RS 214 using different beams 212 at different time and frequency and/or different combinations of beams 212 at different time and frequency. The TRP 210 may configure the UE 115 with the configured time and frequency resources and the configured beam(s) 212 for the transmission of the CSI-RS 214. The UE 215 may receive the CSI-RS(s) 214, perform measurements on the CSI-RS(s) 214, and determine a best beam 212 or a best combination of beams 212 for receiving a DL communication from the TRP 210. The TRP 220 may transmit the CSI-RS(s) 224 using substantially similar mechanisms as the TRP 210 and the UE 215 may perform similar measurements for the CSI-RS 224 as for the CSI-RS 214.

In the illustrated example of FIG. 2, the best beams 212 from the TRP 210 to the UE 215 may correspond to the beam 212a and the beam 212b (shown by the pattern-filled beams). In some instances, the beam 212a and/or 212b may reach the UE 215 via a direct line-of-sight (LOS) path. In some instances, the beam 212a and/or 212b may reach the UE 215 via a non-direction LOS path, for example, scattering off a certain scatter or clusters in the environment. Similarly, the best beams 222 from the TRP 220 to the UE 215 may correspond to the beam 222a and the beam 222b (shown by the pattern-filled beams).

In some aspects, the TRPs 210 and 220 may utilize codebook-based transmissions to form the beams 212 and 214, respectively, for communication with the UE 215. For instance, the TRP 210 may perform precoding to generate the beams 212a and 212b based on a codebook. The codebook may be in the form of a matrix or matrices, which may include the selection of beams, the selection of weights for scaling amplitudes and/or phases at antenna elements of the TRP 210 and/or at the antenna ports of the TRP 210. In some instances, antenna ports may be virtual antenna ports, which may or may not have a direct mapping to physical antenna elements at the TRP 210. In some instances, the codebook may have a dual codebook structure including a wideband matrix and a frequency-selective subband matrix as will be discussed in greater detail below. The codebook may be a predetermined or preconfigured codebook known to the TRP 210 and the UE 215. Thus, the UE 215 may select the best beams 212a and 212b, weightings for the amplitudes and/or phases for the beams 212a and 212b from the codebook. The UE 215 may feedback the selected codebook information to the TRP 210. The TRP 210 may subsequently apply precoding based on the received codebook information to form transmissions beams 212a and 212b with corresponding phase and/or amplitude weights for communication with the UE 215. The feedback codebook information may be referred to as PMI. Similarly, the UE 215 may determine codebook information for the TRP 220 based on measurements performed on the CSI-RS 224 using similar mechanisms as described for the TRP 210.

In some aspects, the UE 215 may transmit a multi-TRP CSI report 230 including a PMI for the TRP 210 and a PMI for the 220. The UE 215 may transmit the multi-TRP CSI report 230 to one of the TRPs 210 and 220. For instance, the UE 215 may transmit the multi-TRP CSI report 230 to the TRP 220 as shown. Alternatively, the UE 215 may transmit the multi-TRP CSI report 230 to the TRP 210 instead of the TRP 220. In some instances, the BS 205 may configure the UE 215 to report the multi-TRP CSI report 230 to a particular TRP. In some other instances, the UE 215 may select a TRP from for reporting the multi-TRP CSI report 230. The multi-TRP CSI report 230 may also be referred to as a combined CSI report or a joint CSI report. While FIG. 2 illustrates the UE 215 in communication with two TRPs 210 and 220, the UE 215 may communicate with any suitable number of TRPs (e.g., about 3, 4 or more). When the UE 215 communicates with a plurality of TRPs, the UE may feedback a multi-TRP CSI report 230 to one of the plurality of TPRs, where the multi-TRP CSI report 230 may include PMI for each TRP of the plurality of TRPs.

In some aspects, the UE 215 may utilize a Type II CSI codebook for PMI feedbacks as described in 3GPP document TS 38.214 Release 15, titled "3rd Generation Partnership Project; Technical Specification Group Radio Access Network; NR; Physical layer procedures for data," December, 2019, Section 5.2.2, which is incorporated herein by reference. The 3GPP Release 15 Type II CSI codebook can provide high-resolution CSI. The high-resolution CSI can provide the TRPs 210 and/or 220 with an accurate approximation of the channel, and thus may provide a high communication performance, for example, in terms of spectral efficiency and signal quality (e.g., signal-noise-ratio (SNR) and/or signal-plus-interference-to-noise (SINR)). However, the high-resolution CSI or PMI includes a large amount of information payload to be fed back to the TRPs 210 and 220. As such, the overhead of feeding back high-resolution PMI is high. For instance, the generation of the high-resolution PMI may increase UE's processing complexity and the transmission or signaling of the high-resolution PMI may increase BW utilization. 3GPP Release 16 attempts to reduce the overhead associated with high-resolution CSI or PMI feedback by transforming part of the feedback (e.g., the frequency-selective subband matrix) to a different domain.

Figure 3:
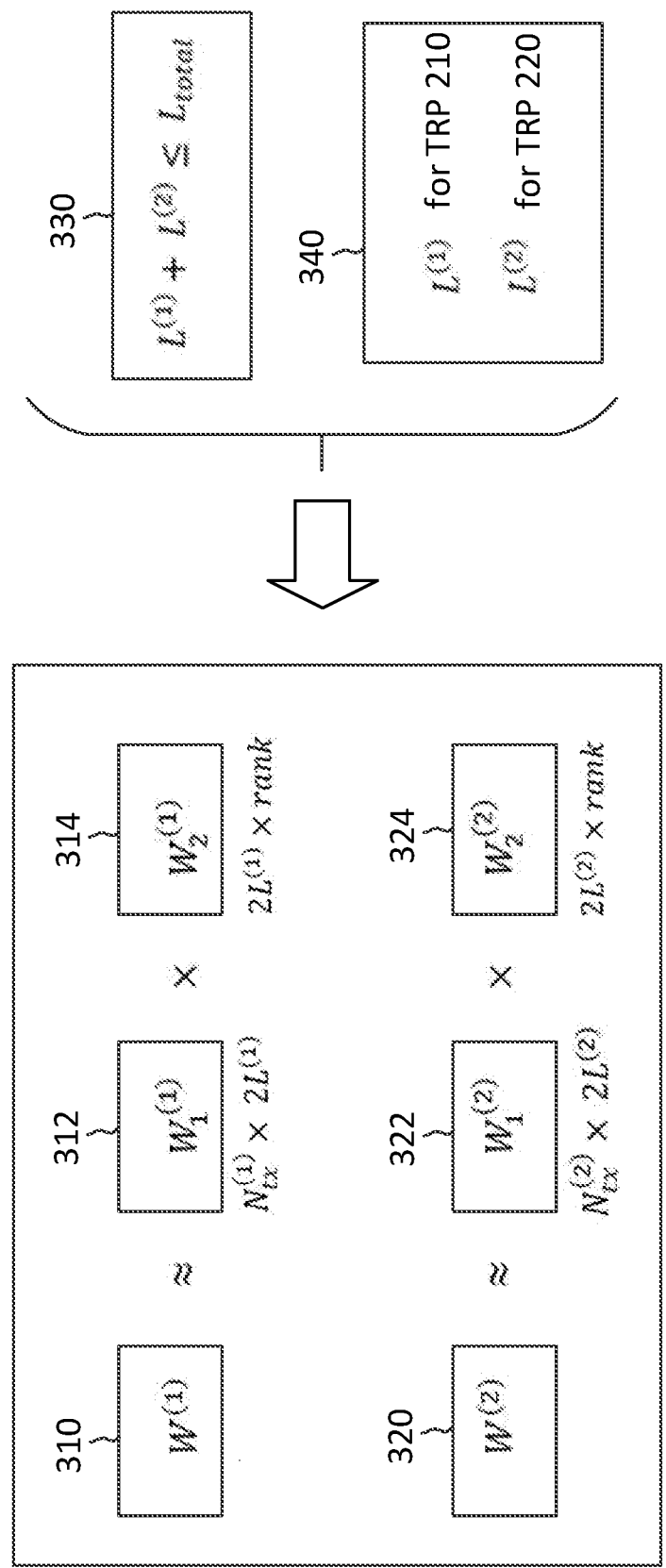
FIG. 3 illustrates a multi-TRP CSI reporting method according to some aspects of the present disclosure.
Figure 4:
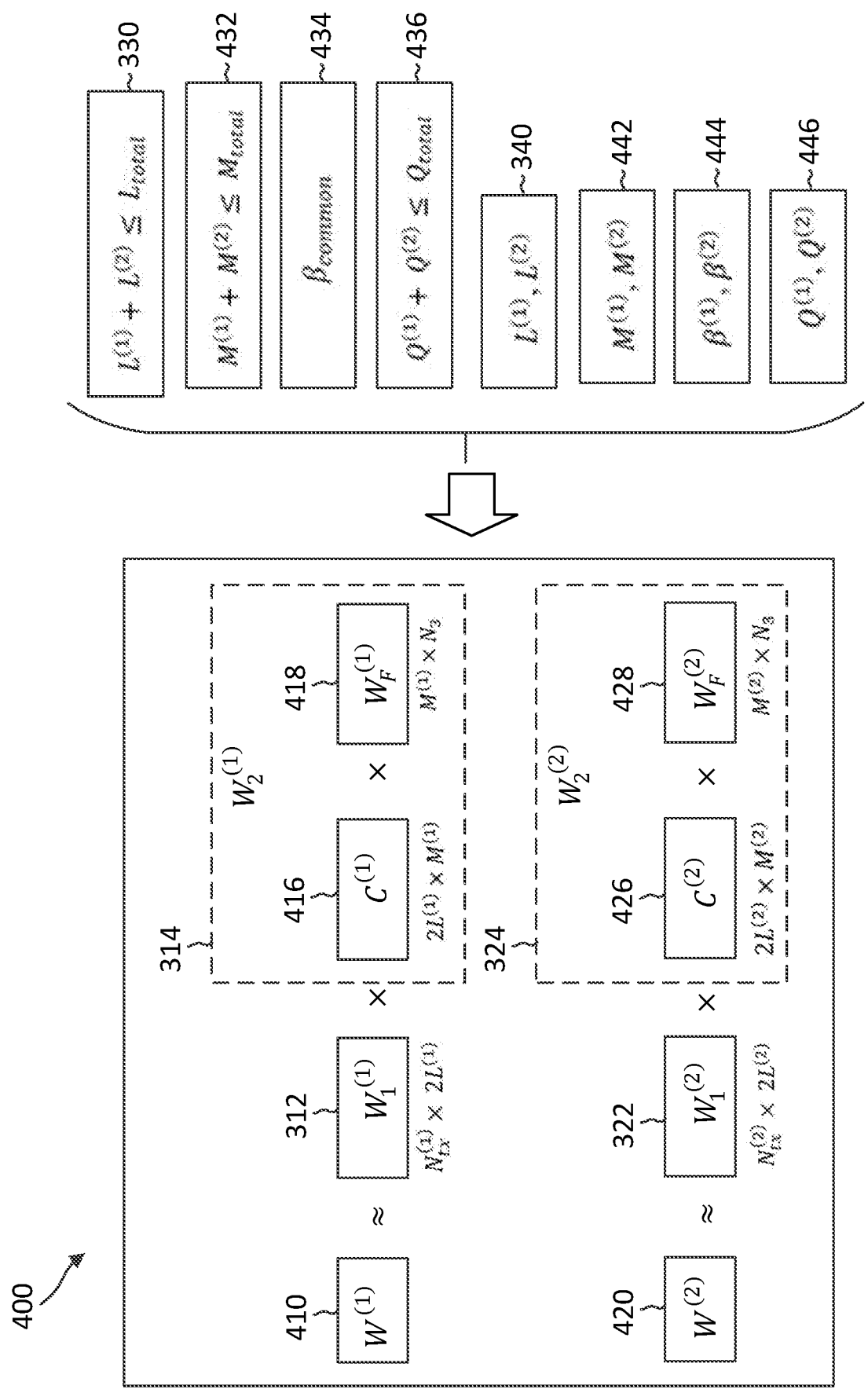
FIG. 4 illustrates a multi-TRP CSI reporting method according to some aspects of the present disclosure.

FIGS. 3 and 4 are discussed in relation to FIG. 2 to illustrate mechanisms for reporting high-resolution PMI for multiple TRPs. FIG. 3 illustrates a multi-TRP CSI reporting method 300 according to some aspects of the present disclosure. The method 300 may be employed by BSs such as the BSs 105 and/or 205, TRPs such as the TRPs 210 and 220, and UEs such as the UEs 115 and 215 in a network such as the networks 100 and 200 for communications. In particular, the UE 215 may feedback PMI to the TRPs 210 and 220 as shown in the method 300. In the illustrated example of FIG. 3, the PMI between the UE 215 and the TRP 210 is shown as a precoding matrix 310, denoted as $W^{(1)}$, and the PMI between the UE 215 and the TRP 210 is shown as a precoding matrix 320, denoted as $W^{(2)}$.

The precoding matrix 310 $W^{(1)}$ includes a weighted linear combination of L orthogonal beams in each spatial layer and in each polarization. The L orthogonal beams may be similar to the beams 212 and 214. As an example, a per spatial layer, per polarization weighed linear combination of L orthogonal beams can be represented as shown below:

$$w_{r,l} = \sum_{i=0}^{L-1} (\rho_{r,l,i}^{WB} \times \rho_{r,l,i}^{SB} \times c_{r,l,i} \times b_i), \quad (1)$$

where r represents the polarization, l represents the spatial layer, $b_i$ represents the $i^{th}$ orthogonal beam, $w_{r,l}$ represents the per spatial layer, per polarization beam coefficient (e.g., for the $l^{th}$ spatial layer in the $r^{th}$ polarization), $\rho_{r,l,i}^{WB}$ represents the per polarization, per spatial layer wideband amplitudes for $b_i$, $\rho_{r,l,i}^{SB}$ represents the per polarization, per spatial layer subband amplitude weighting for $b_i$, $c_{r,i,j}$ represents per polarization, per spatial layer subband phases for $b_i$.

The precoding matrix 310 $W^{(1)}$ may be represented by a wideband precoding matrix 312, denoted as, $W_1^{(1)}$, and a subband precoding matrix 314, denoted as $W_2^{(1)}$, as shown in FIG. 3 and below:

$$W^{(1)} \approx W_1^{(1)} \times W_2^{(1)}. \quad (2)$$

The wideband precoding matrix 312 $W_1^{(1)}$ may have a dimension of $N_{tx}^{(1)} \times 2L^{(1)}$ (e.g., $N_{tx}^{(1)}$ rows and $2L^{(1)}$ columns). $N_{tx}^{(1)}$ represents the number of antenna ports (e.g., $N_1^{(1)}$) at the TRP 210 in a horizontal domain and the number antenna ports (e.g., $N_2^{(1)}$) at the TRP 210 in a vertical domain, where $N_{tx}^{(1)} = N_1^{(1)} \times N_2^{(1)}$. The value $L^{(1)}$ represents the number of beams or spatial domain basis selected from oversampled discrete Fourier transform (DFT) beams of the TRP 210. In other words, the wideband precoding matrix 312 $W_1^{(1)}$ include $2L^{(1)}$ number of spatial domain basis. For instance, the beams 212 shown in FIG. 2 are the oversample DFT beams. The subband precoding matrix 314 $W_2^{(1)}$ may have a dimension of $2L^{(1)} \times N_3^{(1)}$ (e.g., $2L^{(1)}$ rows and $N_3^{(1)}$ columns). The value $N_3^{(1)}$ may represents the number of subbands used by the TRP 210 for communication with the UE 215. The subband precoding matrix 314 $W_2^{(1)}$ is a coefficient matrix and may include $(2L^{(1)} \times N_3^{(1)}) - 1$ number of coefficients. The coefficients may include amplitude weights and phase weights for the $L^{(1)}$ beams (e.g., columns of $W_1^{(1)}$). The spatial domain basis may also be referred to as spatial domain components.

Similarly, the precoding matrix 320 $W^{(2)}$ may include per spatial layer, per polarization beam coefficients similar to the precoding matrix as shown in equation (1) and may be represented as a wideband precoding matrix 322, denoted as, $W_1^{(2)}$, and a subband precoding matrix 324, denoted as $W_2^{(2)}$, as shown in FIG. 3 and below:

$$W^{(2)} \approx W_1^{(2)} \times W_2^{(2)}. \quad (3)$$

The wideband precoding matrix 322 $W_1^{(2)}$ may have a dimension of $N_{tx}^{(2)} \times 2L^{(2)}$ (e.g., $N_{tx}^{(2)}$ rows and $2L^{(2)}$ columns). $N_{tx}^{(2)}$ may represents the number antenna ports (e.g., $N_1^{(2)}$) at the TRP 210 in a horizontal domain and the number antenna ports (e.g., $N_2^{(2)}$) at the TRP 220 in a vertical domain, where $N_{tx}^{(2)} = N_1^{(2)} \times N_2^{(2)}$. $L^{(2)}$ represents the number of beams or spatial domain basis selected from oversampled discrete Fourier transform (DFT) beams of the TRP 220. The subband precoding matrix 314 $W_2^{(2)}$ may have a dimension of $2L^{(2)} \times N_3^{(2)}$ (e.g., $2L^{(2)}$ rows and $N_3^{(2)}$ columns). $N_3^{(2)}$ may represents the number subbands used by the TRP 220 for communication with the UE 215.

The UE 215 may indicate or report the precoding matrix 310 $W^{(1)}$ to the TRP 210 by indicating the wideband precoding matrix 312 $W_1^{(1)}$ and the subband precoding matrix 314 $W_2^{(1)}$. The UE 215 may utilize a codebook to indicate the wideband precoding matrix 312 $W_1^{(1)}$. For instance, the $N_{tx}^{(1)}$ oversample DFT beams may be configured beams known by the TRP 210 and the UE 215. The codebook may include representations of the oversampled DFT beams. The UE 215 may indicate the selection of the $L^{(1)}$ beams out of the beams by indicating a certain codeword formed from the codebook. The UE 215 may indicate the coefficients in the subband precoding matrix 314 $W_2^{(1)}$ by quantizing the coefficients. For instance, each coefficient can be quantized to about 3 bits or about 4 bits. The UE 215 may use substantially similar mechanisms to feedback information associated with the wideband precoding matrix 322 $W_1^{(2)}$ and the subband precoding matrix 324 $W_2^{(2)}$ to the TRP 220.

The amount of information (e.g., in terms of CSI reporting payload bits) for indicating the wideband precoding matrix 312 $W_1^{(1)}$ may not be significant since the indication may include codebook indices. However, the amount of information (e.g., in terms of CSI reporting payload bits) for indicating the subband precoding matrix 312 $W_2^{(1)}$ can be large since the indication may include each of the $(2L^{(1)} \times N_3^{(1)}) - 1$ coefficients in the subband precoding matrix 314 $W_2^{(1)}$. Similarly, the amount of information (e.g., in terms of CSI reporting payload bits) for indicating the wideband precoding matrix 322 $W_1^{(2)}$ may not be significant, but can be large for indicating the subband precoding matrix 322 $W_2^{(2)}$.

When the UE 215 transmits a single multi-TRP CSI report 230 including PMI (including information for $W_1^{(1)}$ and $W_2^{(1)}$) for the TRP 220 and PMI (including information for $W_1^{(2)}$ and $W_2^{(2)}$) for the TRP 220, the payload of the multi-TRP CSI report 230 can be large. If the UE 215 is connected to a greater number of TRPs (e.g., about 3 or 4), the multi-TRP CSI report 230 may scale with the number of TRPs since one PMI feedback is reported for each TRP in communication with the UE 215.

Accordingly, the method 300 provides techniques to limit the amount of PMI that the UE 215 may feedback to the TRPs 210 and 210 so that the overhead associated with multi-TRP PMI feedback may be reduced while maintaining a high-resolution (e.g., channel information with high accuracy) for the per-TRP PMI.

For instance, in the method 300, the BS 205 may limit a total number of spatial domain basis (e.g., the $L^{(1)}$ value or the $L^{(2)}$ value) that the UE 215 may select for reporting a multi-TRP CSI report with per-TRP PMI. For instance, the BS 205 may configure the UE 215 with a configuration 330 indicating a threshold total number of spatial domain basis, denoted as $L_{total}$, that the UE 215 may select for all TRPs (e.g., the TRPs 210 and 220) connected to the UE 215. For example, $L^{(1)}+L^{(2)} \leq L_{total}$ for the TRP 210 and TRP 220. In some instances, the BS 205 may select $L_{total}$, from a set of values, for example, {4, 6, 8}. In other words, $L_{total}$ may have a value of 4, 6, or 8. In some instances, the threshold value $L_{total}$ in the configuration 330 may be dependent on the total number of TRPs. For instance, $L_{total}$ may be set to a value of 6 for 2 TRPs and may be set to a value of 8 for 3 TRPs. When the BS 205 indicates a $L_{total}$ value, the UE 215 may determine $L^{(1)}$ and $L^{(2)}$ based on $L_{total}$ and generate PMI for the TRP 210 and 220 according to the determined $L^{(1)}$ and the determined $L^{(2)}$.

In some aspects, the BS 205 may limit a number of spatial domain basis (e.g., the $L^{(1)}$ value or the $L^{(2)}$ value) that the UE 215 may select for each TRP. For instance, the BS 205 may configure the UE 215 with a configuration 340 indicating a per TRP L value. For instance, the configuration 340 may indicate a value for $L^{(1)}$ and a value for $L^{(2)}$. Thus, the UE 215 may generate PMI for the TRP 210 based on the configured $L^{(1)}$ value and may generate PMI for the TRP 220 based on the configured $L^{(2)}$ value. In some other aspects, the BS 205 may configure the UE 215 with both configurations 330 and 340.

FIG. 4 illustrates a multi-TRP CSI reporting method 400 according to some aspects of the present disclosure. The method 400 may be employed by BSs such as the BSs 105 and/or 205, TRPs such as the TRPs 210 and 220, and UEs such as the UEs 115 and 215 in a network such as the networks 100 and 200 for communications. In particular, the UE 215 may feedback PMI to the TRPs 210 and 220 as shown in the method 400. The method 400 may be substantially similar to the method 300, but may transform a subband precoding matrix (e.g., the wideband precoding matrix 322 $W_1^{(2)}$ and the subband precoding matrix 324 $W_2^{(2)}$) to a DFT domain to reduce PMI reporting overhead (e.g., the multi-TRP CSI report payload size) as described in 3GPP 38.214 Release 16. The method 400 may use the same spatial domain basis matrix or wideband precoding matrix 312 and 322 as in the method 300, and may use the same reference numerals as in FIG. 3 for simplicity's sake.

In the illustrated example of FIG. 4, the subband precoding matrix 312 $W_2^{(1)}$ is transformed into a coefficient matrix 416, denoted as $C^{(1)}$, and a frequency compression matrix 418, denoted as, $W_F^{(1)}$, by applying frequency domain compression. The precoding matrix with the frequency domain compression may be represented as a precoding matrix 410 $W^{(1)}$ in FIG. 4 and shown below:

$$W^{(1)} \approx W_1^{(1)} \times C^{(1)} \times W_F^{(1)}. \quad (4)$$

The frequency compression matrix 418 $W_F^{(1)}$ may have a dimension of $M^{(1)} \times N_3^{(1)}$ (e.g., $M^{(1)}$ rows and $M^{(1)}$ columns). $M^{(1)}$ represents the number of frequency domain basis in the frequency compression matrix 418 $W_F^{(1)}$. The frequency compression matrix 418 $W_F^{(1)}$ is similar to the wideband precoding matrix 312 $W_1^{(1)}$, but in a frequency domain. For instance, $M^{(1)}$ represents the number of frequency domain basis selected from an oversampled DFT codebook. $M^{(1)}$ may have a value less than $N_3^{(1)}$ after the frequency domain compression. The frequency domain compression can be applied to each spatial layer and each polarization. The UE 215 may feedback a codeword identifying the $M^{(1)}$ frequency domain basis to the TRP 210. The coefficient matrix 416 $C^{(1)}$ may have a dimension of $2L^{(1)} \times M^{(1)}$ (e.g., $2L^{(1)}$ rows and $M^{(1)}$ columns). The coefficient matrix 416 $C^{(1)}$ may include amplitude coefficients and phase coefficients for weighting the linear combination of the $2L^{(1)}$ spatial domain basis in the wideband precoding matrix 312 $W_1^{(1)}$. The coefficient matrix 416 $C^{(1)}$ may be sparse, for example, not all matrix elements in the coefficient matrix 416 $C^{(1)}$ may have a non-zero value (or a significant value). Thus, the UE 215 may choose to quantize and feedback the non-zero coefficients in the coefficient matrix 416 $C^{(1)}$ to the TRP 210. In some instances, the UE 215 may apply a threshold value to the coefficients in the coefficient matrix 416 $C^{(1)}$ and report the coefficients that exceed the threshold. The frequency domain basis may also be referred to as frequency domain components.

Similar frequency domain compression can be applied to the subband precoding matrix 322 $W_2^{(2)}$. The subband precoding matrix 322 $W_2^{(2)}$ is transformed into a coefficient matrix 426, denoted as $C^{(2)}$, and a frequency compression matrix 428, denoted as, $W_F^{(2)}$. The precoding matrix with the frequency domain compression is represented as a precoding matrix 420 $W^{(2)}$ and shown below:

$$W^{(2)} \approx W_1^{(2)} \times C^{(2)} \times W_F^{(2)}. \quad (5)$$

The frequency compression matrix 428 $W_F^{(2)}$ may have a dimension of $M^{(2)} \times N_3^{(2)}$ (e.g., $M^{(2)}$ rows and $N_3^{(2)}$ columns). $M^{(2)}$ represents the number of frequency domain basis in the frequency compression matrix 428 $W_F^{(2)}$. The UE 215 may feedback a codeword identifying the $M^{(2)}$ frequency domain basis to the TRP 220. The coefficient matrix 426 $C^{(2)}$ may have a dimension of $2L^{(2)} \times M^{(2)}$ (e.g., $2L^{(2)}$ rows and $M^{(2)}$ columns). Similarly, the UE 215 may choose to quantize and feedback the non-zero coefficients in the coefficient matrix 426 $C^{(2)}$ to the TRP 220.

The UE 215 may report PMI for the TRP 210 and the TRP 220 by indicating the wideband precoding matrix 312 $W_1^{(1)}$ and the wideband precoding matrix 322 $W_1^{(2)}$ as discussed above with reference to FIG. 3. The UE 215 may indicate the frequency compression matrix 418 $W_F^{(1)}$ and the frequency compression matrix 428 $W_F^{(2)}$ using similar mechanisms as for the wideband precoding matrices 312 and 322. For instance, an oversampled DFT codebook may be configured and known by the TRP 210 and the UE 215. The codebook may include representations of the oversampled frequency domain basis. The UE 215 may indicate the selection of the $M^{(1)}$ frequency domain basis from the oversampled DFT codebook by indicating a certain codeword formed from the codebook. Similarly, the UE 215 may indicate the selection of the $M^{(2)}$ frequency domain basis from an oversampled DFT codebook (configured at the TRP 220 and the UE 215) by indicating a certain codeword formed from the codebook. In some instances, the TRP 210 and 220 may utilize the same oversampled DFT codebook. In some other instances, the TRP 210 and 220 may utilize different oversampled DFT codebooks.

The UE 215 may indicate the non-zero valued coefficients or significant coefficients (e.g., meeting a certain threshold value) in the coefficient matrix 416 $C^{(1)}$ and the coefficient matrix 426 $C^{(2)}$. The UE 215 may report the locations of the non-zero coefficients in the coefficient matrix 416 $C^{(1)}$ and the coefficient matrix 426 $C^{(2)}$. For instance, the UE 215 may indicate the non-zero coefficients in the coefficient matrix 416 $C^{(1)}$ using a bitmap of size $2 \times L^{(1)} \times M^{(1)}$ (corresponding to the size of the coefficient matrix 416 $C^{(1)}$), where each bit in the bitmap may correspond to the location of a coefficient within the coefficient matrix 416 $C^{(1)}$. Similarly, the UE 215 may indicate the non-zero coefficients in the coefficient matrix 426 $C^{(2)}$ using a bitmap of size $2 \times L^{(2)} \times M^{(2)}$ (corresponding to the size of the coefficient matrix 426 $C^{(2)}$), where each bit in the bitmap may correspond to the location of a coefficient within the coefficient matrix 426 $C^{(2)}$. The UE 125 may quantize the non-zero coefficients in the coefficient matrix 416 $C^{(1)}$ and the coefficient matrix 426 $C^{(2)}$ and report the quantized coefficient values. For instance, the UE 215 may quantize the non-zero or significant coefficients in the coefficient matrix 416 $C^{(1)}$ using $Q^{(1)}$ bits, and may quantize the non-zero or significant coefficients in the coefficient matrix 426 $C^{(2)}$ using $Q^{(2)}$ bits.

In some aspects, the number of per layer non-zero coefficients in the coefficient matrix 416 $C^{(1)}$ may be represented by $K_0^{(1)}$ as shown below:

$$K_0^{(1)} = 2 \times L^{(1)} \times M^{(1)} \times \beta^{(1)}, \quad (6)$$

where $\beta^{(1)}$ is a parameter that controls the number of per spatial layer non-zero coefficients that are to be reported to the TRP 210. In some instances, the $\beta^{(1)}$ may be dependent on the rank (e.g., the number of spatial layers) in use for communication between the TRP 210 and the UE 215. For instance, $\beta^{(1)}$ may be set to a value of ¼ or ½ for a rank that is less than or equal to 2 (e.g., with one spatial layer or two spatial layers). For a rank that is greater than 2 (e.g., more than two spatial layers), the BS 205 may limit the total number of coefficients to report for all spatial layer to, for example, $2 \times K_0^{(1)}$.

Similarly, the number of per spatial layer non-zero coefficients in the coefficient matrix 426 $C^{(2)}$ may be represented by $K_0^{(2)}$ as shown below:

$$K_0^{(2)} = 2 \times L^{(2)} \times M^{(2)} \times \beta^{(2)}, \quad (7)$$

where $\beta^{(2)}$ is a parameter that controls the number of per spatial layer non-zero coefficients that are to be reported to the TRP 220.

While the method 400 may reduce the PMI payload size with the frequency domain compression, the amount of PMI or payload size may scale with the number of TRPs when multi-TRP CSI reporting is used. Accordingly, the method 400 provides techniques to limit or restrict the values of M (e.g., number of frequency domain basis), β (e.g., the scaling factor for the number of coefficients), and/or Q (e.g., the quantization levels or number of quantized bits for each coefficient) for multi-TRP CSI reporting.

In some aspects, the BS 205 may limit a total number of frequency domain basis that the UE 215 may use for a multi-TRP CSI report (e.g., the report 230). For instance, the BS 205 may configure the UE 215 with a configuration 432 indicating a threshold total number of spatial domain basis, denoted as $M_{total}$, that the UE 215 may select for TRPs (e.g., the TRPs 210 and 220) connected to the UE 215. For example, $M^{(1)} + M^{(2)} \leq M_{total}$ for the TRP 210 and TRP 220. In some instances, the BS 205 may select $M_{total}$ from a set of values. In some instances, the threshold value $M_{total}$ in the configuration 432 may be dependent on the total number of TRPs. For instance, $M_{total}$ may be set to a value of 4 for 2 TRPs and may be set to a value of 6 for 3 TRPs. When the BS 205 indicates a $M_{total}$ value, the UE 215 may determine $M^{(1)}$ and $M^{(2)}$ based on $M_{total}$ and generate PMI for the TRP 210 and 220 according to the determined $M^{(1)}$ and the determined $M^{(2)}$.

In some aspects, the BS 205 may limit a number of frequency domain basis (e.g., the $M^{(1)}$ value or the $M^{(2)}$ value) that the UE 215 may select for each TRP. For instance, the BS 205 may configure the UE 215 with a configuration 442 indicating a per TRP M value. For instance, the configuration 442 may indicate a value for $M^{(1)}$ and a value for $M^{(2)}$. Thus, the UE 215 may generate PMI for the TRP 210 based on the configured $M^{(1)}$ value and may generate PMI for the TRP 220 based on the configured $M^{(2)}$ value.

In some aspects, the BS 205 may limit a total number of coefficients that the UE 215 may report for a multi-TRP CSI report (e.g., the report 230) by indicating a common β value, denoted as $\beta_{common}$ for all TRPs connected to the UE 215 as shown in the configuration 434. Thus, the UE 215 may apply set $\beta^{(1)}$ to $\beta_{common}$ and set $\beta^{(2)}$ to $\beta_{common}$. The controlling of $\beta^{(1)}$ and $\beta^{(2)}$ values in turns controls the number of coefficients to be reported for the coefficient matrix 416 $C^{(1)}$ and the coefficient matrix 426 $C^{(2)}$, respectively. In other words, the BS 205 may limit the total number of coefficients (e.g., $K_{total}$) that the UE 215 may report to $K_0^{(1)} + K_0^{(2)} \leq K_{total}$.

In some aspects, the BS 205 may limit a number of coefficients that the UE 215 may report for each TRP. For instance, the BS 205 may configure the UE 215 with a configuration 444 indicating a per TRP β value. As shown, the BS 205 may indicate a value for $\beta^{(1)}$ and a value for $\beta^{(2)}$. Thus, the UE 215 may generate PMI for the TRP 210 based on the configured $\beta^{(1)}$ value and may generate PMI for the TRP 220 based on the configured $\beta^{(2)}$ value.

In some instances, the total rank (or the total number of spatial layers) among the TRPs used for communicating with the UE 215 is greater than 2. As an example, the UE 215 may utilize two spatial layers for communication with the TRP 210 and may utilize one spatial layer for communication with the TRP 220. As another example, the UE 215 may utilize one spatial layer for communication with the TRP 210 and may utilize two spatial layers for communication with the TRP 220. As a further example, UE 215 may utilize two spatial layers for communication with the TRP 210 and may utilize two spatial layers for communication with the TRP 220. When the total rank among the TRPs is greater than 2, the BS 205 may further control the total number of coefficients to report for the coefficient matrix 416 $C^{(1)}$ and the coefficient matrix 426 $C^{(2)}$ by applying a scaling factor X to $K_0$. For example, the number of coefficients to be reported for the coefficient matrix 416 $C^{(1)}$ and the coefficient matrix 426 $C^{(2)}$ can be represented by $K_0 \times X$. In an example, the scaling factor X can be about 2.

In some aspects, the BS 205 may limit a total number of per-coefficient quantization bits that the UE 215 may use for reporting the coefficients (in the coefficient matrix 416 $C^{(1)}$ and the coefficient matrix 426 $C^{(2)}$) in a multi-TRP CSI report (e.g., the report 230). For instance, the BS 205 may configure the UE 215 with a configuration 436 indicating a threshold total number of per-coefficient quantization bits, denoted as $Q_{total}$, that the UE 215 may use for quantizing coefficients to be reported to all TRPs (e.g., the TRPs 210 and 220) connected to the UE 215. For example, $Q^{(1)} + Q^{(2)} \leq Q_{total}$ for the TRP 210 and TRP 220. In some instances, the BS 205 may further indicate different per-coefficient quantization levels or different number of per-coefficient quantization bits for amplitude coefficients and for phase coefficients. For instance, the BS may indicate that an amplitude coefficient may be quantized into 3 bits (e.g., 8 quantization levels) and a phase coefficient may be quantized into 2 bits (e.g., 4 quantization levels). In some instances, the BS 205 may select different per-coefficient quantization levels for different TRPs. For instance, the BS 205 may indicate 3 bits for quantizing each amplitude coefficient and 2 bits for quantizing each phase coefficient for reporting to the TRP 210, and may indicate 2 bits for quantizing each amplitude coefficient and 2 bits for quantizing phase coefficients for reporting to the TRP 220.

In some aspects, the BS 205 may limit a per-coefficient quantization level that the UE 215 may report for each TRP. For instance, the BS 205 may configure the UE 215 with a configuration 446 indicating a number of per-TRP, per-coefficient quantization bits. As shown, the BS 205 may indicate a value for $Q^{(1)}$ and a value for $Q^{(2)}$. Thus, the UE 215 may generate PMI for the TRP 210 based on the configured $Q^{(1)}$ value and may generate PMI for the TRP 220 based on the configured $Q^{(2)}$ value.

In some aspects, a BS (e.g., the BSs 105 and/or 205) may configure a UE (e.g., the UEs 115 and 215) with any suitable combination of the configurations 330, 432, 434, 436, 340, 442, 444, and/or 446. For instance, the BS may configure the UE with a single configuration 330, 432, 434, 436, 340, 442, 444, or 446. In some other instances, the BS may configure the UE with configurations 330, 432, 434, and 436 to indicate a total number of spatial domain basis, a total number of frequency domain basis, a total number of coefficients, and a total number of per-coefficient quantization bits across all TRPs to be included in a PMI report. In some other instances, the BS may configure the UE with configurations 340, 442, 444, and 446 to indicate a per-TRP number of spatial domain basis, a per-TRP number of frequency domain basis, a per-TRP number of coefficients, and a number of per-TRP, per-coefficient quantization bits to be included in a PMI report.

Figure 5:
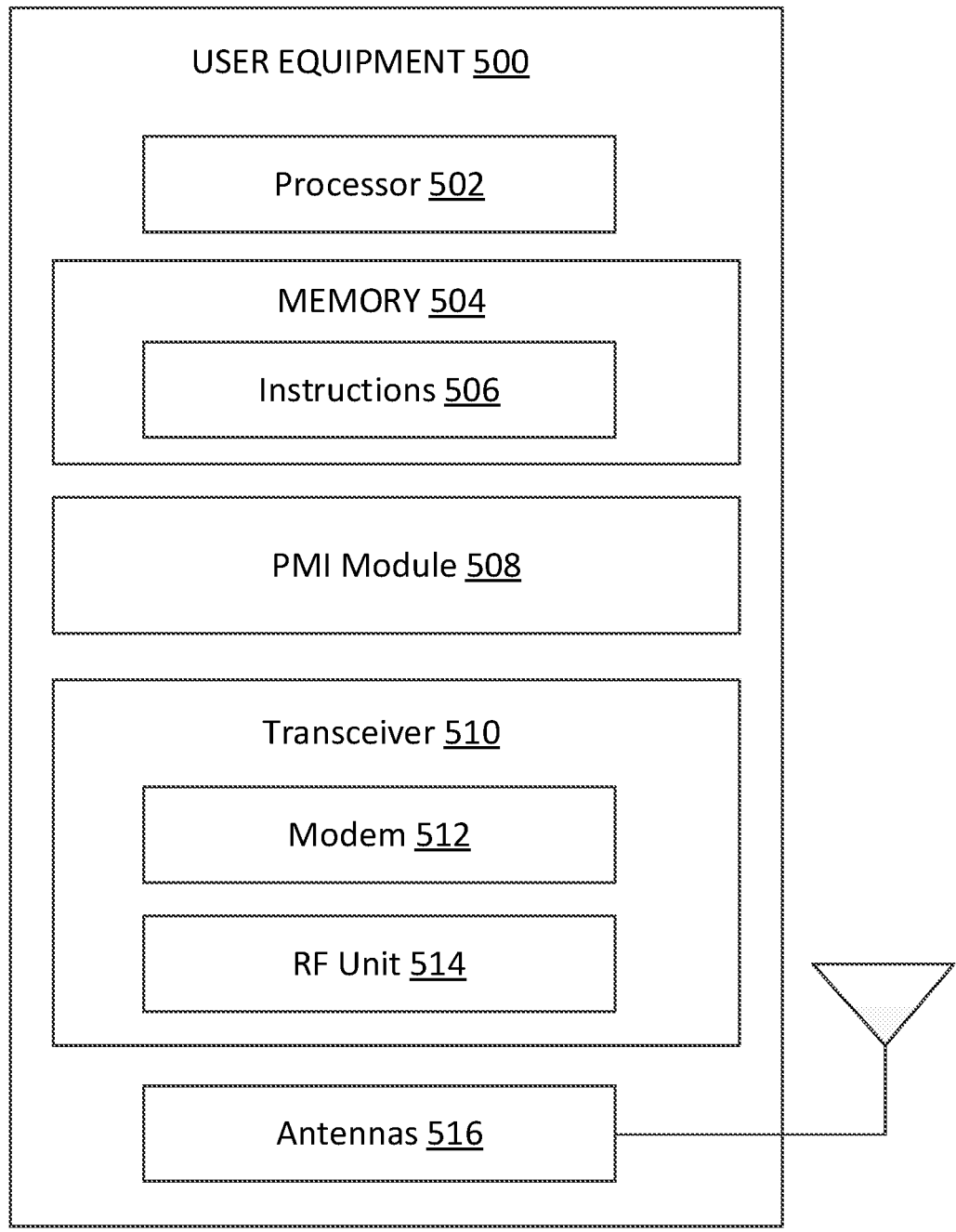
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1 or a UE 215 discussed above in FIG. 2. As shown, the UE 500 may include a processor 502, a memory 504, a PMI module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4 and 8-10. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The PMI module 508 may be implemented via hardware, software, or combinations thereof. For example, the PMI module 508 may be implemented as a processor, circuit, and/or instructions 506 stored in the memory 504 and executed by the processor 502. In some instances, the PMI module 508 can be integrated within the modem subsystem 512. For example, the PMI module 508 can be implemented by a combination of software components (e.g., executed by a DSP or a general processor) and hardware components (e.g., logic gates and circuitry) within the modem subsystem 512.

The PMI module 508 may be used for various aspects of the present disclosure, for example, aspects of FIGS. 1-4 and 8-10. For instance, the PMI module 508 is configured to receive a configuration, for example, from a BS 105 or BS 205, indicating a precoder size parameter for a plurality of TRPs (e.g., the TRPs 210 and 220), receive a first reference signal (e.g., the CSI-RS 214) from a first TRP of the plurality of TRPs, receive a second reference signal (e.g., the CSI-RS 224) from a second TRP of the plurality of TRPs, and transmit a multi-TRP CSI report (e.g., the report 230) to the first TRP or the second TRP. The multi-TRP CSI report may include a first feedback component based on the first reference signal and a second feedback component based on the second reference signal, where a combined payload size of the first feedback component and the second feedback component is based on the precoder size parameter.

In some aspects, the precoder size parameter is associated with a first precoder of the first TRP and a second precoder of the second TRP. In some instances, the first precoder may include a precoding matrix similar to the precoding matrix 310 $W^{(1)}$ and the second precoder may include a precoding matrix similar to the precoding matrix 320 $W^{(2)}$ as discussed above with reference to FIG. 3. In some other instances, the first precoder may include a precoding matrix similar to the precoding matrix 410 $W^{(1)}$ and the second precoder may include a precoding matrix similar to the precoding matrix 420 $W^{(2)}$ as discussed above with reference to FIG. 4.

In some aspects, the configuration may indicate a threshold for a quantity of spatial domain basis that the UE may report for each TRP or a threshold for a combined quantity of spatial domain basis the UE may report for all TRPs. Additionally or alternatively, the configuration may indicate a threshold for a quantity of frequency domain basis that the UE may report for each TRP or a threshold for a combined quantity of frequency domain basis the UE may report for all TRPs. Additionally or alternatively, the configuration may indicate a threshold for a quantity of precoding matrix coefficients that the UE may report for each TRP or a threshold for a combined quantity of precoding matrix coefficients the UE may report for all TRPs. Additionally or alternatively, the configuration may indicate a threshold for a quantity of per-coefficient quantization bits that the UE may use for each TRP or a threshold for a combined quantity of per-coefficient quantization bits that the UE may use for all TRPs.

In some aspects, when the configuration indicate a threshold for a combined quantity of spatial domain basis the UE may report for all TRPs, the PMI module 508 is configured to determine at least one of a first quantity of spatial domain components for the first precoder or a second quantity of spatial domain component for the second precoder based on the threshold.

In some aspects, when the configuration indicate a threshold for a combined quantity of frequency domain basis the UE may report for all TRPs, the PMI module 508 is configured to determine at least one of a first quantity of frequency domain components for the first precoder or a second quantity of frequency domain component for the second precoder based on the threshold.

In some aspects, when the configuration indicate a threshold for a combined quantity of precoding matrix coefficients the UE may report for all TRPs, the PMI module 508 is configured to determine at least one of a first quantity of non-zero valued (or with a significant value) precoding matrix coefficients for the first precoder or a second quantity of non-zero valued (or with a significant value) precoding matrix coefficients for the second precoder based on the threshold.

In some aspects, when the configuration indicates a combined quantity of per-coefficient quantization bits that the UE may use for all TRPs, the PMI module 508 is configured to determine at least one of a first quantity of per-coefficient quantization bits for the first precoder or a second quantity of per-coefficient quantization bits for the second precoder. Mechanisms for performing efficient multi-TRP CSI reporting with high-resolution PMI are described in greater detail herein.

As shown, the transceiver 510 may include the modem subsystem 512 and the RF unit 514. The transceiver 510 can be configured to communicate bi-directionally with other devices, such as the BSs 105 and/or 205. The modem subsystem 512 may be configured to modulate and/or encode the data from the memory 504 and/or the PMI module 508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., CSI-RS report, multi-TRP CSI report, PMI feedback) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., CSI-RSs, CSI-RS report configuration, CSI-RS resource configuration, UL communication signal, PUSCH signals) to the PMI module 508 for processing. The antennas 516 may include multiple antennas of similar or different designs in order to sustain multiple transmission links. The RF unit 514 may configure the antennas 516.

In an aspect, the transceiver 510 may coordinate with the PMI module 508 to receive a configuration indicating a precoder size parameter for a plurality of TRPs. The transceiver 510 is also configured to receive, from a first TRP of the plurality of TRPs, a first reference signal. The transceiver 510 may also coordinate with the PMI module 508 to receive, from a second TRP of the plurality of TRPs, a second reference signal, the second TRP being different from first TRP. The transceiver 510 may also coordinate with the PMI module 508 to transmit, to the first TRP or the second TRP, a CSI report including a first feedback component based on the first reference signal and a second feedback component based on the second reference signal, where a combined payload size of the first feedback component and the second feedback component is based on the precoder size parameter.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
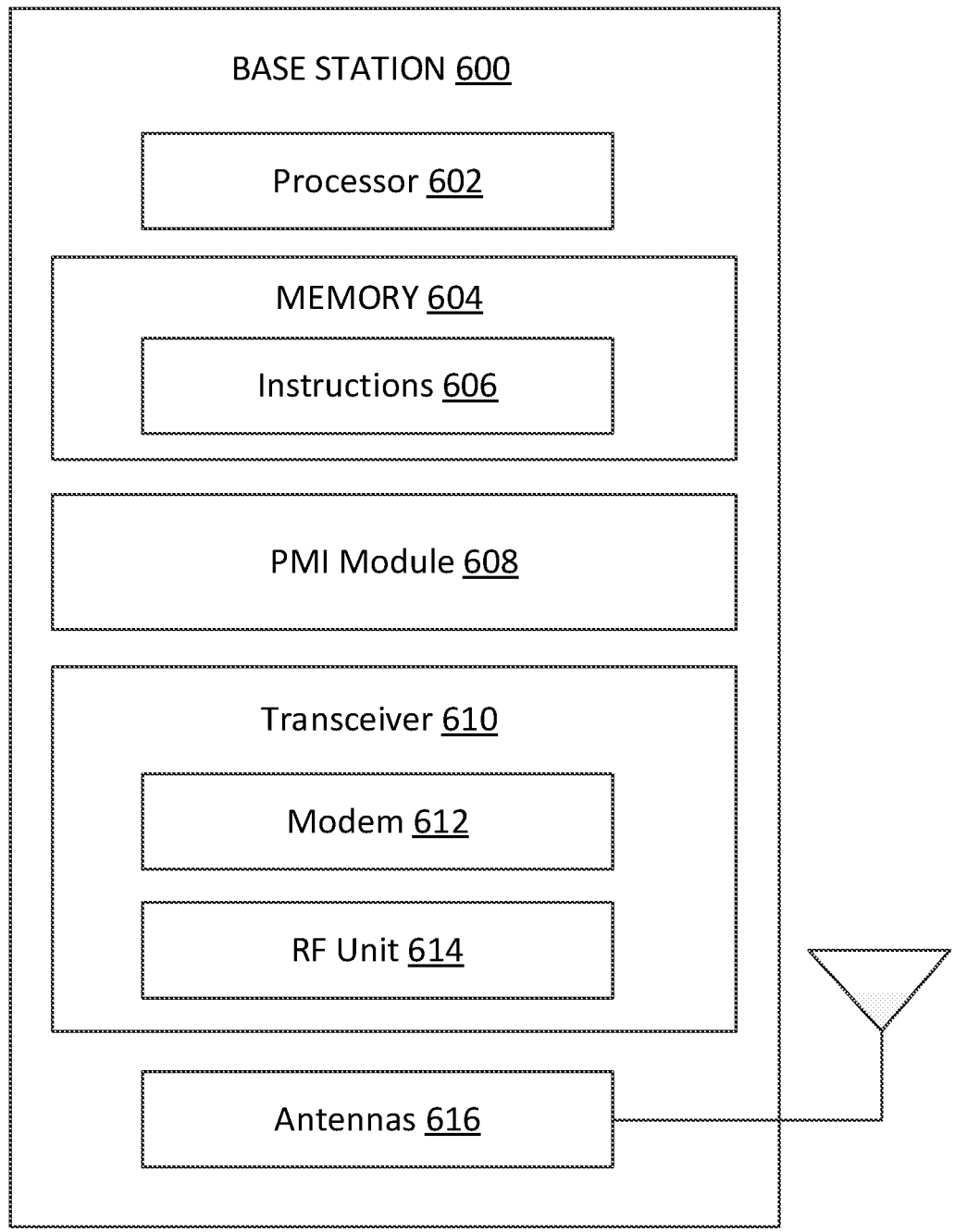
FIG. 6 is a block diagram of a base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1 or a BS 205 in the network 200 as discussed above in FIG. 2. As shown, the BS 600 may include a processor 602, a memory 604, a PMI module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4, 8-9, and 11. Instructions 606 may also be referred to as code, which may be interpreted broadly to include any type of computer-readable statement(s) as discussed above with respect to FIG. 5.

The PMI module 608 may be implemented via hardware, software, or combinations thereof. For example, the PMI module 608 may be implemented as a processor, circuit, and/or instructions 606 stored in the memory 604 and executed by the processor 602. In some instances, the PMI module 608 can be integrated within the modem subsystem 612. For example, the PMI module 608 can be implemented by a combination of software components (e.g., executed by a DSP or a general processor) and hardware components (e.g., logic gates and circuitry) within the modem subsystem 612.

The PMI module 608 may be used for various aspects of the present disclosure, for example, aspects of FIGS. 1-4, 8-9, and 11. For instance, the PMI module 608 is configured to transmit a configuration, for example, to a UE such as the UE 115, 215, or 500, indicating a precoder size parameter for a plurality of TRPs (e.g., the TRPs 210 and 220), transmit a first reference signal (e.g., the CSI-RS 214) via a first TRP of the plurality of TRPs, transmit a second reference signal (e.g., the CSI-RS 224) via a second TRP of the plurality of TRPs, and receive a multi-TRP CSI report (e.g., the report 230) for the first TRP or the second TRP, for example, from the UE. The multi-TRP CSI report may include a first feedback component based on the first reference signal and a second feedback component based on the second reference signal, where a combined payload size of the first feedback component and the second feedback component is based on the precoder size parameter.

In some aspects, the precoder size parameter is associated with a first precoder of the first TRP and a second precoder of the second TRP. In some instances, the first precoder may include a precoding matrix similar to the precoding matrix 310 $W^{(1)}$ and the second precoder may include a precoding matrix similar to the precoding matrix 320 $W^{(2)}$ as discussed above with reference to FIG. 3. In some other instances, the first precoder may include a precoding matrix similar to the precoding matrix 410 $W^{(1)}$ and the second precoder may include a precoding matrix similar to the precoding matrix 420 $W^{(2)}$ as discussed above with reference to FIG. 4.

In some aspects, the configuration may indicate a threshold for a quantity of spatial domain basis that the UE may report for each TRP or a threshold for a combined quantity of spatial domain basis the UE may report for all TRPs. Additionally or alternatively, the configuration may indicate a threshold for a quantity of frequency domain basis that the UE may report for each TRP or a threshold for a combined quantity of frequency domain basis the UE may report for all TRPs. Additionally or alternatively, the configuration may indicate a threshold for a quantity of precoding matrix coefficients that the UE may report for each TRP or a threshold for a combined quantity of precoding matrix coefficients the UE may report for all TRPs. Additionally or alternatively, the configuration may indicate a threshold for a quantity of per-coefficient quantization bits that the UE may use for each TRP or a threshold for a combined quantity of per-coefficient quantization bits that the UE may use for all TRPs. Mechanisms for configuring sidelink UEs for channel access in a shared radio frequency band and/or an unlicensed band are described in greater detail herein.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., CSI-RSs, CSI-RS report configuration, CSI-RS resource configuration, UL communication signal, PUSCH signals) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., CSI-RS report, multi-TRP CSI report, PMI feedback) to the PMI module 608 for processing. The antennas 616 may include multiple antennas of similar or different designs in order to sustain multiple transmission links.

In an aspect, the transceiver 610 may coordinate with the PMI module 608 to transmit a configuration indicating a precoder size parameter for a plurality of TRPs. The transceiver 610 is also configured to transmit, via a first TRP of the plurality of TRPs, a first reference signal. The transceiver 610 may also coordinate with the PMI module 608 to transmit, via a second TRP of the plurality of TRPs, a second reference signal, the second TRP being different from first TRP. The transceiver 610 may also coordinate with the PMI module 608 to receive, via the first TRP or the second TRP, a CSI report including a first feedback component based on the first reference signal and a second feedback component based on the second reference signal, where a combined payload size of the first feedback component and the second feedback component is based on the precoder size parameter.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
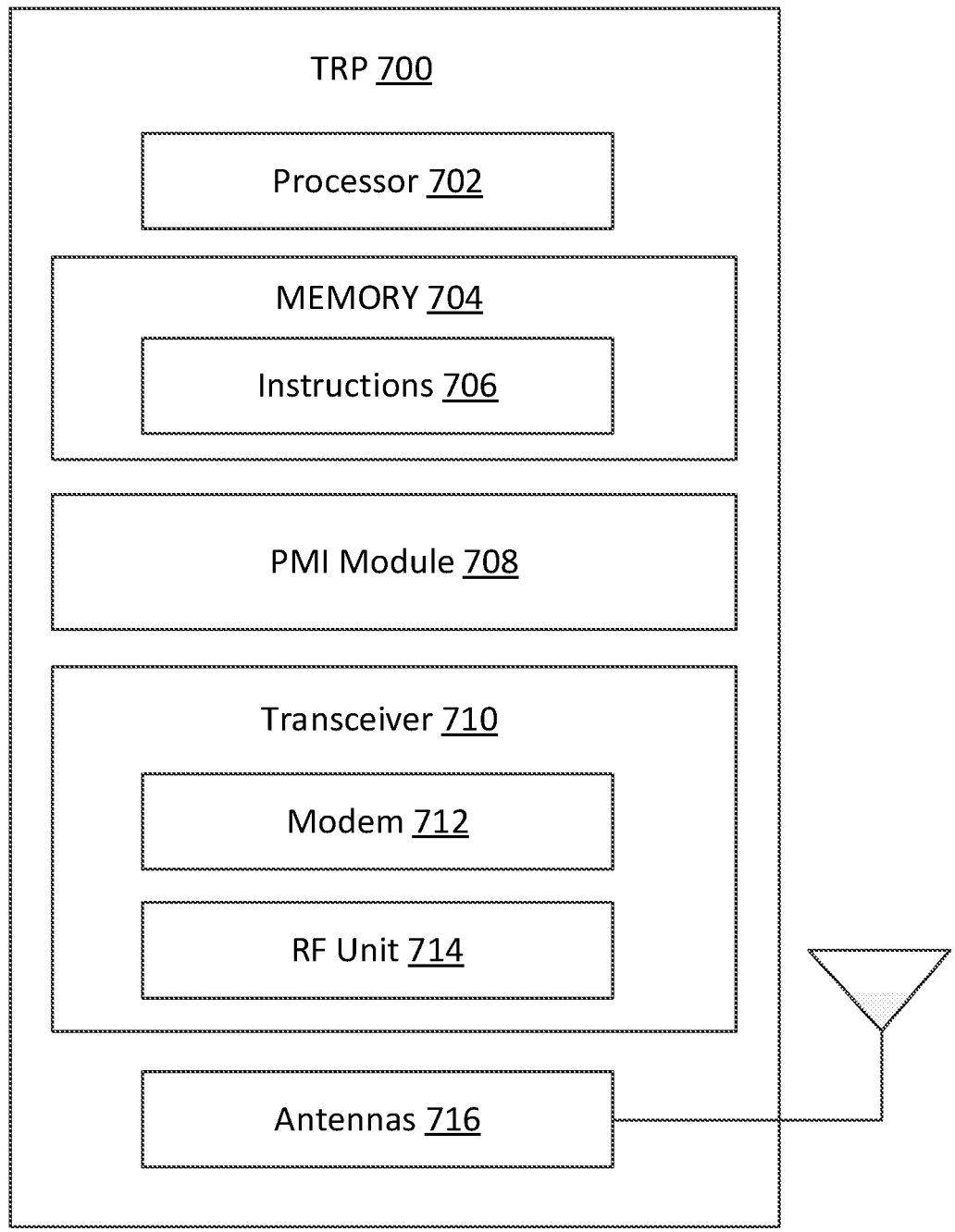
FIG. 7 is a block diagram of a transmission-reception point (TRP) according to some aspects of the present disclosure.

FIG. 7 is a block diagram of an exemplary TRP 700 according to some aspects of the present disclosure. The TRP 700 may be a BS 105 in the network 100 as discussed above in FIG. 1 or a BS 205 in the network 200 as discussed above in FIG. 2. As shown, the TRP 700 may include a processor 702, a memory 704, a PMI module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1-4, 8-9, and 11. Instructions 706 may also be referred to as code, which may be interpreted broadly to include any type of computer-readable statement(s) as discussed above with respect to FIG. 5.

The PMI module 708 may be implemented via hardware, software, or combinations thereof. For example, the PMI module 708 may be implemented as a processor, circuit, and/or instructions 706 stored in the memory 704 and executed by the processor 702. In some instances, the PMI module 708 can be integrated within the modem subsystem 712. For example, the PMI module 708 can be implemented by a combination of software components (e.g., executed by a DSP or a general processor) and hardware components (e.g., logic gates and circuitry) within the modem subsystem 712.

The PMI module 708 may be used for various aspects of the present disclosure, for example, aspects of FIGS. 1-4, 8-9, and 11. For instance, the PMI module 708 is configured to transmit a configuration, for example, to a UE such as the UE 115, 215, or 500, indicating a precoder size parameter for a plurality of TRPs (e.g., the TRPs 210 and 220) including the TRP 700, transmit a first reference signal (e.g., the CSI-RS 214), and receive a multi-TRP CSI report (e.g., the report 230) including include a first feedback component based on the first reference signal for the TRP 700 and a second feedback component based on a second reference signal of a second TRP of the plurality of TRPs, where a combined payload size of the first feedback component and the second feedback component is based on the precoder size parameter.

In some aspects, the precoder size parameter is associated with a first precoder of the first TRP and a second precoder of the second TRP. In some instances, the first precoder may include a precoding matrix similar to the precoding matrix 310 $W^{(1)}$ and the second precoder may include a precoding matrix similar to the precoding matrix 320 $W^{(2)}$ as discussed above with reference to FIG. 3. In some other instances, the first precoder may include a precoding matrix similar to the precoding matrix 410 $W^{(1)}$ and the second precoder may include a precoding matrix similar to the precoding matrix 420 $W^{(2)}$ as discussed above with reference to FIG. 4.

In some aspects, the configuration may indicate a threshold for a quantity of spatial domain basis that the UE may report for each TRP or a threshold for a combined quantity of spatial domain basis the UE may report for all TRPs. Additionally or alternatively, the configuration may indicate a threshold for a quantity of frequency domain basis that the UE may report for each TRP or a threshold for a combined quantity of frequency domain basis the UE may report for all TRPs. Additionally or alternatively, the configuration may indicate a threshold for a quantity of precoding matrix coefficients that the UE may report for each TRP or a threshold for a combined quantity of precoding matrix coefficients the UE may report for all TRPs. Additionally or alternatively, the configuration may indicate a threshold for a quantity of per-coefficient quantization bits that the UE may use for each TRP or a threshold for a combined quantity of per-coefficient quantization bits that the UE may use for all TRPs. Mechanisms for configuring sidelink UEs for channel access in a shared radio frequency band and/or an unlicensed band are described in greater detail herein.

As shown, the transceiver 710 may include the modem subsystem 712 and the RF unit 714. The transceiver 710 can be configured to communicate bi-directionally with other devices, such as the UEs 115 and/or 500 and/or another core network element. The modem subsystem 712 may be configured to modulate and/or encode data according to a MCS, e.g., a LDPC coding scheme, a turbo coding scheme, a convolutional coding scheme, a polar coding scheme, a digital beamforming scheme, etc. The RF unit 714 may be configured to process (e.g., perform analog to digital conversion or digital to analog conversion, etc.) modulated/encoded data (e.g., CSI-RSs, CSI-RS report configuration, CSI-RS resource configuration, UL communication signal, PUSCH signals) from the modem subsystem 712 (on outbound transmissions) or of transmissions originating from another source such as a UE 115 and/or UE 500. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 or 500 according to some aspects of the present disclosure. The antennas 716 may further receive data messages transmitted from other devices and provide the received data messages for processing and/or demodulation at the transceiver 710. The transceiver 710 may provide the demodulated and decoded data (e.g., CSI-RS report, multi-TRP CSI report, PMI feedback) to the PMI module 708 for processing. The antennas 716 may include multiple antennas of similar or different designs in order to sustain multiple transmission links.

In an aspect, the transceiver 710 may coordinate with the PMI module 708 to transmit a configuration indicating a precoder size parameter for a plurality of TRPs including the TRP 700. The transceiver 710 is also configured to transmit a first reference signal. The transceiver 710 may also coordinate with the PMI module 708 to receive a CSI report including a first feedback component based on the first reference signal and a second feedback component based on a second reference signal of a second TRP of the plurality of TRPs, where a combined payload size of the first feedback component and the second feedback component is based on the precoder size parameter.

In an aspect, the TRP 700 can include multiple transceivers 710 implementing different RATs (e.g., NR and LTE). In an aspect, the TRP 700 can include a single transceiver 710 implementing multiple RATs (e.g., NR and LTE). In an aspect, the transceiver 710 can include various components, where different combinations of components can implement different RATs.

Figure 8:
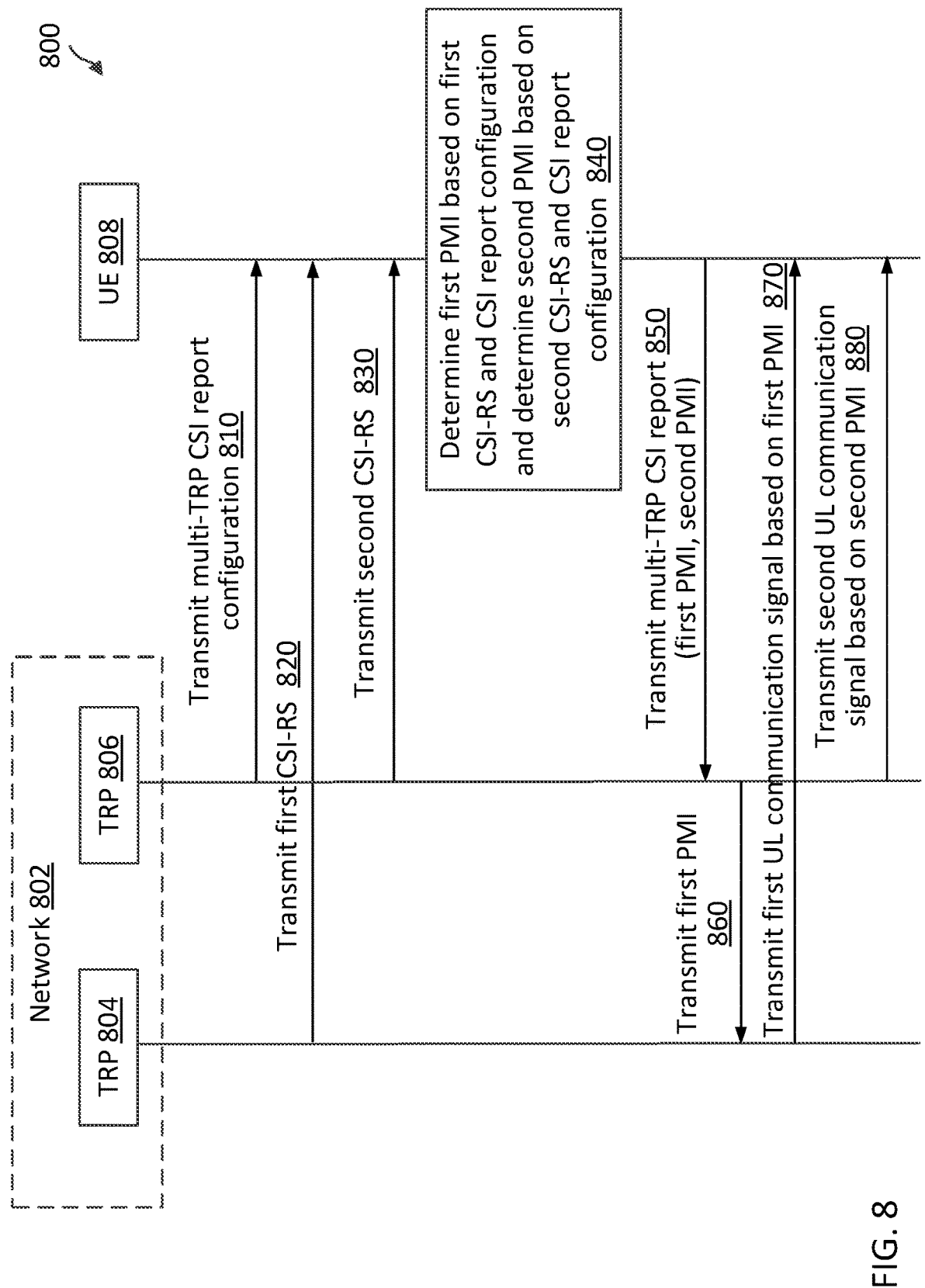
FIG. 8 is a signaling diagram illustrating a multi-TRP CSI reporting method according to some aspects of the present disclosure.
Figure 9:
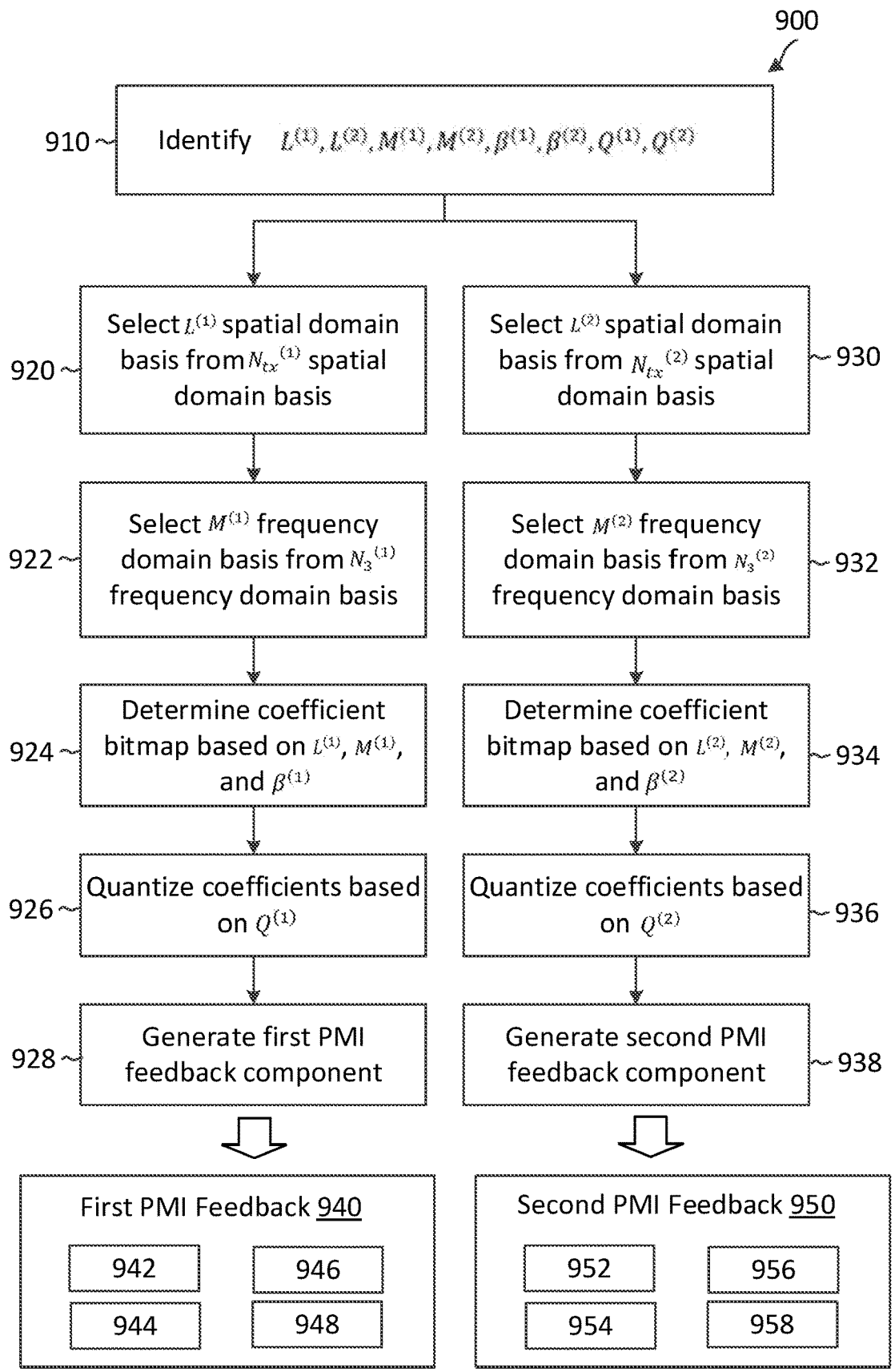
FIG. 9 is a flow diagram of a multi-TRP CSI reporting method according to some aspects of the present disclosure.

FIG. 8 is discussed in relation to FIG. 9 to illustrate multi-TRP CSI reporting mechanisms for high-resolution PMI feedback. FIG. 8 is a signaling diagram illustrating a multi-TRP CSI reporting method 800 according to some aspects of the present disclosure. The method 800 may be implemented between a UE 808 (e.g., UEs 115, 215, and/or 400) and two TRPs 804 and 806 (e.g., the TRPs 210, 220, and/or 700) located in a network 802. The UE 808, the TRP 804, and the TRP 806 may correspond to the UE 215, the TRP 210, and the TRP 220, respectively. The method 800 may employ similar multi-CSI reporting mechanisms as described above with respect to FIGS. 3-7 and may reuse the same parameter representations as described above with respect to FIGS. 3-7. As illustrated, the method 800 includes a number of enumerated steps, but embodiments of the method 800 may include additional steps before, after, and in between the enumerated steps. In some embodiments, one or more of the enumerated steps may be omitted or performed in a different order.

At action 810, the TRP 806 transmits a multi-TRP CSI report configuration to the UE 808, for example, via RRC signaling. The multi-TRP CSI report configuration may be used for generating a multi-TRP CSI report similar to the report 230 of FIG. 2. In some instances, the TRPs 804 and the TRP 806 may be coupled to a BS (e.g., the BSs 105, 205, and/or 600) in the network 802 and the BS may configure the TRP 806 to transmit the CSI reporting configuration. In some other instances, the TRP 806 may be similar to a BS (e.g., the BSs 105, 205, and/or 600) and may determine the CSI report configuration for the UE 808 and transmit the determined CSI report configuration to the UE 808. In some instances, the TRP 806 may utilize one or more components, such as the processor 702, the PMI module 708, the transceiver 710, the modem 712, and the one or more antennas 716, to transmit the CSI report configuration.

The multi-TRP CSI report configuration may include one or more precoder size parameters for the TRP 804 and the TRP 806. The one or more precoder size parameters may be associated with a first precoder of the TRP 804 and a second precoder of the second TRP 806. The first precoder and the second precoder may be based on a Type II CSI codebook described in the 3GPP document TS 38.214 Release 15 or Release 16. For instance, the first precoder may include a precoding matrix similar to the precoding matrix 310 $W^{(1)}$ and the second precoder may include a precoding matrix similar to the precoding matrix 320 $W^{(2)}$ as discussed above with reference to FIG. 3. Alternatively, the first precoder may include a precoding matrix similar to the precoding matrix 410 $W^{(1)}$ and the second precoder may include a precoding matrix similar to the precoding matrix 420 $W^{(2)}$ as discussed above with reference to FIG. 4.

In some aspects, the first precoder may include a first wideband precoding matrix similar to the wideband precoding matrix 312 $W_1^{(1)}$. The second precoder may include a second wideband precoding matrix similar to the wideband precoding matrix 322 $W_1^{(2)}$. The one or more precoder size parameters may be associated with a quantity of spatial domain basis (e.g., the spatial domain basis $b_1$) in the first wideband precoding matrix of the TRP 804 and a quantity of spatial domain basis in the second precoding matrix of the TRP 806. In some instances, the one or more precoder size parameters may indicate a total quantity of spatial domain basis across all TRPs to be included in a multi-TRP CSI report (e.g., the report 230). For instance, the one or more precoder size parameters may indicate a total quantity of spatial domain basis (e.g., $L_{total}$) to be reported for precoding at the TRP 804 and the TRP 806 (e.g., as shown in the configuration 330). In some instances, the one or more precoder size parameters may indicate a quantity of spatial domain basis for each TRP to be included in a multi-TRP CSI report. For instance, the one or more precoder size parameters may indicate a quantity of spatial domain basis (e.g., $L^{(1)}$) to be reported for precoding at the TRP 804 and a quantity of spatial domain basis (e.g., $L^{(2)}$) to be reported for precoding at the TRP 806 (e.g., as shown in the configuration 340).

In some aspects, the first precoder may include a first frequency compression matrix similar to the frequency compression matrix 418 $W_F^{(1)}$ and a first coefficient matrix similar to the coefficient matrix 416 $C^{(1)}$ as discussed above with reference to FIG. 4. The second precoder may include a second frequency compression matrix similar to the frequency compression matrix 428 $W_F^{(2)}$ and a second coefficient matrix similar to the coefficient matrix 426 $C^{(2)}$ as discussed above with reference to FIG. 4. In some aspects, the one or more precoder size parameters may be associated with a quantity of frequency domain basis in the first frequency compression matrix of the TRP 804 and a quantity of frequency domain basis in the second frequency compression matrix of the TRP 806. In some instances, the one or more precoder size parameters may indicate a total quantity of frequency domain basis across all TRPs to be included in a multi-TRP CSI report. For instance, the one or more precoder size parameters may indicate a total quantity of frequency domain basis (e.g., $M_{total}$) to be reported for precoding at the TRP 804 and the TRP 806 (e.g., as shown in the configuration 432). In some instances, the one or more precoder size parameters may indicate a quantity of frequency domain basis for each TRP to be included in a multi-TRP CSI report. For instance, the one or more precoder size parameters may indicate a quantity of spatial domain basis (e.g., $M^{(1)}$) to be reported for precoding at the TRP 804 and a quantity of spatial domain basis (e.g., $M^{(2)}$) to be reported for precoding at the TRP 806 (e.g., as shown in the configuration 442).

In some aspects, the one or more precoder size parameters may be associated with a parameter (e.g., $\beta$) that controls a quantity of matrix coefficients (e.g., non-zero coefficients in the first coefficient matrix and non-zero coefficients in the second coefficient matrix) to be reported for precoding at the TRP 804 and the TRP 806 (e.g., as shown in equations (6) and (7) discussed above with respect to FIG. 4). In some instances, the one or more precoder size parameters may indicate a common parameter for controlling a quantity of coefficients for each TRP to be included in a multi-TRP CSI report. For instance, the one or more precoder size parameters may indicate a common parameter (e.g., $\beta_{common}$) for controlling a quantity of matrix coefficients to be reported for precoding at the TRP 804 and for controlling a quantity of matrix coefficients to be reported for precoding at the TRP 806 (e.g., as shown in the configuration 434). In some instances, the one or more precoder size parameters may indicate a separate parameter for controlling a quantity of matrix coefficients to be reported for precoding at each TRP. For instance the one or more precoder size parameters may indicate a first parameter (e.g., $\beta^{(1)}$) for controlling a quantity of matrix coefficients to be reported for precoding at the TRP 804 and a second parameter (e.g., $\beta^{(2)}$) for controlling a number of matrix coefficients to be reported for precoding at the TRP 806 (e.g., as shown in the configuration 444).

In some aspects, the one or more precoder size parameters may be associated with a quantization level for quantizing the coefficients (e.g., the non-zero coefficients) in the first coefficient matrix to be reported for precoding at the TRP 804 and in the second coefficient matrix to be reported for precoding at the TRP 806. In some instances, the one or more precoder size parameters may indicate a total quantity of quantization levels or a total quantity of quantization bits for reporting matrix coefficients for all TRPs. For instance, the one or more precoder size parameters may indicate a total quantity of quantization bits (e.g., $Q_{total}$) for quantizing each non-zero-valued matrix coefficient in the first precoder of the TRP 804 and for quantizing each non-zero-valued matrix coefficient in the second precoder of the TRP 806 (e.g., as shown in the configuration 436). In some instances, the one or more precoder size parameters may indicate a quantity of quantization bits for quantizing each matrix coefficient to be reported for precoding at each TRP. For instance, the one or more precoder size parameters may indicate a quantity of quantization bits (e.g., $Q^{(1)}$) for the TRP 804 and a quantity of quantization bits (e.g., $Q^{(2)}$) for the TRP 806 (e.g., as shown in the configuration 446).

At action 820, the TRP 804 transmits one or more first CSI-RSs (e.g., the CSI-RS 214). The TRP 804 may transmit the one or more first CSI-RSs in one or more beam directions (e.g., the beams 212). Each first CSI-RS may include a predetermine sequence or a set of predetermined pilot symbols at predetermined time and frequency locations. In some instances, the TRP 804 may utilize one or more components, such as the processor 702, the PMI module 708, the transceiver 710, the modem 712, and the one or more antennas 716, to transmit the one or more first CSI-RSs.

At action 830, the TRP 806 transmits one or more second CSI-RSs (e.g., the CSI-RS 224). The TRP 806 may transmit the one or more first CSI-RSs in one or more beam directions (e.g., the beams 222). Each second CSI-RS may include a predetermined sequence or a set of predetermined pilot symbols at predetermined time and frequency locations. In some instances, the second CSI-RSs may be the same as the first CSI-RSs. For instance, the second CSI-RSs and the first CSI-RSs may include the same sequence. In some other instances, the second CSI-RSs may be different than the first CSI-RSs. For instance, the second CSI-RSs and the first CSI-RSs may include different sequences. In some instances, the TRP 806 may utilize one or more components, such as the processor 702, the PMI module 708, the transceiver 710, the modem 712, and the one or more antennas 716, to transmit the one or more second CSI-RSs.

At action 840, the UE 808 determines first PMI (e.g., the first PMI feedback component 940 of FIG. 9) for the TRP 804 based on the one or more first CSI-RSs and the multi-TRP CSI report configuration and determines second PMI (e.g., the second PMI feedback component 950 of FIG. 9) for the TRP 806 based on the one or more second CSI-RSs and the multi-TRP CSI report configuration. In some instances, the UE 808 may utilize one or more components, such as the processor 502, the PMI module 508, the transceiver 510, the modem 512, and the one or more antennas 516, to determine the first PMI for the TRP 804 and the second PMI for the TRP 806 as will be discussed further in FIG. 9.

FIG. 9 is a flow diagram of a multi-TRP CSI reporting method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115, 215, 500, and/or 802 may utilize one or more components, such as the processor 502, the memory 504, the PMI module 508, the transceiver 510, the modem 512, and the one or more antennas 516, to execute the steps of method 900. The method 900 may be implemented in conjunction with the method 800. For instance, the UE 808 may implement the method 900 at action 840 of the method 800. As illustrated, the method 900 includes a quantity of enumerated steps, but aspects of the method 900 may include additional steps before, after, and in between the enumerated steps. In some aspects, one or more of the enumerated steps may be omitted or performed in a different order. The method 900 is illustrated using the same reuse the same parameter representations as described above in the method 800. While the method 900 is described in the context of determining PMI for precoders similar to the precoding matrices 410 and 420 shown in FIG. 4, similar mechanisms may be applied to determine PMI for the precoding matrices 310 and 320 shown in FIG. 3.

At block 910, the UE 808 identifies a plurality of precoder size parameters, for example, including $L^{(1)}$, $L^{(2)}$, $M^{(1)}$, $M^{(2)}$, $\beta^{(1)}$, $\beta^{(2)}$, $Q^{(1)}$, and $Q^{(2)}$, for example, based on the multi-TRP CSI report configuration received at 810. As discussed above, the multi-TRP CSI report configuration may include various configurations similar to the configurations 330, 432, 436, 446, 340, 442, 444, and 446 discussed above with reference to FIG. 4. For instance, the multi-TRP CSI report configuration may indicate per TRP precoder size parameters (e.g., $L^{(1)}$, $L^{(2)}$, $M^{(1)}$, $M^{(2)}$, $\beta^{(1)}$, $\beta^{(2)}$, $Q^{(1)}$, and/or $Q^{(2)}$). Accordingly, the UE 808 may identify $L^{(1)}$, $L^{(2)}$, $M^{(1)}$, $M^{(2)}$, $\beta^{(1)}$, $\beta^{(2)}$, $Q^{(1)}$, and $Q^{(2)}$ from the multi-TRP CSI report configuration. Alternatively, the multi-TRP CSI report configuration may indicate a threshold precoder size parameter and/or a common precoder size parameter for all TRPs (e.g., (e.g., $L_{total}$, $M_{total}$, $\beta_{common}$, and/or $Q_{total}$) For instance, when multi-TRP CSI report configuration indicates a total quantity of spatial domain basis (e.g., $L_{total}$) to be reported for precoding at the TRP 804 and the TRP 806, the UE 808 may determine $L^{(1)}$ for the TRP 804 and $L^{(2)}$ for the TRP 806 based on the total quantity of spatial domain basis $L_{total}$. In some instances, the UE 808 may configure $L^{(1)}$ and $L^{(2)}$ with the same value (e.g., by dividing $L_{total}$ by the total number of TRPs). In some other instances, the UE 808 may configure $L^{(1)}$ and $L^{(2)}$ with different values, for example, depending on the total number of TRPs to be reported for multi-CSI PMI.

When multi-TRP CSI report configuration indicates a total quantity of frequency domain basis (e.g., $M_{total}$) to be reported for precoding at the TRP 804 and the TRP 806, the UE 808 may determine $M^{(1)}$ for the TRP 804 and $M^{(2)}$ for the TRP 806 based on the total quantity of spatial domain basis $M_{total}$. In some instances, the UE 808 may configure $M^{(1)}$ and $M^{(2)}$ with the same value (e.g., by dividing $M_{total}$ by the total number of TRPs). In some other instances, the UE 808 may configure $M^{(1)}$ and $M^{(2)}$ with different values, for example, depending on the total number of TRPs to be reported for multi-CSI PMI.

When multi-TRP CSI report configuration indicates a common parameter (e.g., $\beta_{common}$) for controlling a quantity of coefficients to be reported for precoding at the TRP 804 and the TRP 806, the UE 808 may set $\beta^{(1)}$ and $\beta^{(2)}$ to $\beta_{common}$ and determine a quantity of coefficients to report for the TRP 804 as shown in equation (6) and a quantity of coefficients to report for the TRP 806 as shown in equation (7). In some aspects, the UE 808 may adjusts the quantity of coefficients for the TRP 804 and the quantity of coefficients for the TRP 806 based on the number of spatial layers used for communication with the TRP 804 and the TRP 806.

When multi-TRP CSI report configuration indicates a total quantity of quantization bits (e.g., $Q_{total}$) for quantizing the coefficients to be reported for precoding at the TRP 804 and the TRP 806, the UE 808 may determine $Q^{(1)}$ for the TRP 804 and $Q^{(2)}$ for the TRP 806 based on the total quantity of quantization bits $Q_{total}$. In some instances, the UE 808 may configure $Q^{(1)}$ and $Q^{(2)}$ with the same value (e.g., by dividing $Q_{total}$ by the total number of TRPs). In some other instances, the UE 808 may configure $Q^{(1)}$ and $Q^{(2)}$ with different values. As an example, $Q_{total}$ may have a value of 7 and the UE 808 may set $Q^{(1)}$ to 4 and $Q^{(2)}$ to 3. In other words, the UE 808 may quantize each non-zero coefficients in the first coefficient matrix (e.g., the coefficient matrix 416 $C^{(1)}$) for the TRP 804 discussed above at 810 with 4 bits (e.g., 8 quantization levels) and may quantize each non-zero coefficients in the second coefficient matrix (e.g., the coefficient matrix 416 $C^{(1)}$) for the TRP 804 discussed above at 810 with 3 bits. In another example, the UE 808 may determine different quantization levels phase coefficients and amplitude coefficients. Referring to the same example where $Q_{total}$ may have a value of 7 and the UE 808 may set $Q^{(1)}$ to 4 and $Q^{(2)}$ to 3. The UE 808 may further use 5 bits for quantizing amplitude coefficients in the first coefficient matrix for the TRP 804 and may use 3 bits for quantizing phase coefficients in the first coefficients matrix (assuming the number of amplitude coefficients and the number of phase coefficients are about the same so that the average number of quantization bits per coefficients is about 4. Similarly, the UE 808 may further use 4 bits for quantizing amplitude coefficients in the second coefficient matrix for the TRP 806 and may use 2 bits for quantizing phase coefficients in the second coefficient matrix (assuming the number of amplitude coefficients and the number of phase coefficients are about the same so that the average number of quantization bits per coefficients is about 3). In general, the UE 808 may distribute the $Q_{total}$ bits among amplitude coefficients and phase coefficients of coefficient matrices across the TRPs in any suitable manner.

At block 920, the UE 808 selects $L^{(1)}$ spatial domain basis from $N_{tx}^{(1)}$ spatial domain basis (e.g., oversampled DFT beams) based on measurements obtained from the one or more first CSI-RS received at action 820 of FIG. 8.

At block 922, the UE 808 selects $M^{(1)}$ frequency domain basis from $N_3^{(1)}$ frequency domain basis based on measurements obtained from the one or more second CSI-RS received at action 820 of FIG. 8.

At block 924, the UE 808 determines a coefficient bitmap based on $L^{(1)}$, $M^{(1)}$, and $\beta^{(1)}$. For instance, the UE 808 may generate a bitmap with a size of $2 \times L^{(1)} \times M^{(1)}$ corresponding to the size of the first coefficient matrix (e.g., the coefficient matrix 416 $C^{(1)}$) for the TRP 804. For instance, each bit in the bitmap may correspond to a position of the coefficient in the coefficient matrix. The bitmap can be configured in any configuration with each bit having a one-to-one correspondence to a position (e.g., in an $i^{th}$ column and $j^{th}$ row) of a matrix element (e.g., coefficient) within the first coefficient matrix. For instance, the bitmap can be a two-dimensional (2D) bitmap having the same dimension as the first coefficient matrix. In some other instances, the bitmap can a one-dimensional (1D) bitmap. The UE 808 may determine a quantity of coefficients (e.g., non-zero values) in the coefficient matrix to report for the TRP 804 by computing $2 \times L^{(1)} \times M^{(1)} \times \beta^{(1)}$ as shown in equation (6). The UE 808 may configure the bitmap to indicate the locations of the non-zero valued coefficients in the first coefficient matrix. For instance, the UE 808 may set a bit within the bitmap to a value of 1 to indicate a non-zero valued coefficient in a corresponding location within the coefficient matrix. Conversely, the UE 808 may set a bit within the bitmap to a value of 0 to indicate that a coefficient (e.g., a value of 0 or close to 0) in a corresponding location within the coefficient matrix is not reported.

At block 926, the UE 808 quantizes each non-zero valued coefficients in the first coefficient matrix to be reported using $Q^{(1)}$ quantity of bits.

At block 928, the UE 808 generates a first PMI feedback component 940 including a first codeword 942 indicating the $L^{(1)}$ selected spatial domain basis, a second codeword 944 indicating the $M^{(1)}$ selected spatial domain basis, the quantized coefficients (e.g., coefficients 946), and the bitmap (e.g., bitmap 948) indicating locations of the quantized coefficients within the first coefficient matrix.

The UE 808 may determine a second PMI feedback component 950 by performing the operations shown at 930, 932, 934, 936, and 938, where operations at 930, 932, 934, 936, and 938 include features similar to operations at 920, 922, 924, 926, and 928, respectively. Accordingly, for sake of brevity, details of those operations will not be repeated here. As shown, the second PMI feedback component 950 may include a first codeword 952 indicating the $L^{(2)}$ selected spatial domain basis, a second codeword 954 indicating the $M^{(2)}$ selected spatial domain basis, the quantized coefficients (e.g., coefficients 956), and the bitmap (e.g., bitmap 958) indicating locations of the quantized coefficients 956 within the second coefficient matrix.

In some aspects, the overhead of indicating a spatial domain basis selection (e.g., the codeword 942 or 952) in a PMI report can be represented as shown below:

$$O_{sd} = 2 + \mathrm{ceil}(\log_2(C_{N1 \times N2}^L)), \quad (8)$$

where $O_{sd}$ represents the number of overhead bits for indicating the spatial domain basis selection and $C_{N1 \times N2}^L$ represents the selection of L spatial domain basis from (N1×N2) oversampled DFT beams. L may correspond to $L^{(1)}$ for the codeword 942 and may $L^{(2)}$ correspond to for the codeword 952.

The overhead of indicating a frequency domain basis selection (e.g., the codeword 944) in a PMI report can be represented as shown below:

$$O_{fd} = \mathrm{ceil}(\log_2(C_{N_3}^M)), \quad (9)$$

where $O_{fd}$ represents the number of overhead bits for indicating the frequency domain basis selection and a represents the selection of M spatial domain basis from $N_3$ DFT codebook basis. M may correspond to $M^{(1)}$ for the codeword 944 and may $M^{(2)}$ correspond to for the codeword 954.

The overhead of indicating locations of non-zero coefficients (e.g., the bitmap 948 and the coefficients 946) in a PMI report can be represented as shown below:

$$O_{coef} = 2 \times L \times M + K_0 \times Q, \quad (10)$$

where $O_{coef}$ represents the number of overhead bits for indicating the non-zero coefficient, which may include the bitmap 948 with a size of (2×L×M) and the total number of bits for representing all non-zero coefficients (e.g., the number of non-zero coefficients $K_0$×per-coefficient quantization bits Q). Q may correspond to $Q^{(1)}$ for the coefficients

946 and may $Q^{(2)}$ for the coefficients 956. Thus, the total per-TRP PMI overhead may be represented as ($O_{sd}$+$O_{fd}$+ $O_{coeff}$).

Referring back to FIG. 8, at 850, the UE 808 transmits a multi-TRP CSI report (e.g., the report 230) to the TRP 806. The multi-TRP CSI report may include the first PMI (e.g., the first PMI feedback component 940) for the TRP 804 and the second PMI (e.g., the second PMI feedback component 950) for the TRP 806. In some instances, the UE 808 may utilize one or more components, such as the processor 502, the PMI module 508, the transceiver 510, the modem 512, and the one or more antennas 516, to transmit the multi-TRP CSI report. The combined payload size of the first PMI and the second PMI for the multi-TRP CSI report may be based on the one precoder size parameters as shown in equations (8) to (10) discussed above with respect to FIG. 9.

At action 860, upon receiving the multi-TRP CSI report, the TRP 806 may transmit the first PMI to the TRP 804. In some instances, the TRP 806 may utilize one or more components, such as the processor 702, the PMI module 708, the transceiver 710, the modem 712, and the one or more antennas 716, to transmit the first PMI to the TRP 804. In some instances, the TRP 806 may utilize one or more components, such as the processor 702, the PMI module 708, the transceiver 710, the modem 712, and the one or more antennas 716, to transmit the first PMI to a BS (e.g., the BSs 105, 205, and/or 600) coupled to the TRP 804 and the TRP 806 and the BS may configure the TRP 804 with the first PMI.

At action 870, the TRP 804 may transmit a first UL communication signal (e.g., a PUSCH signal) to the UE 808. The TRP 804 may generate the first UL communication using a first precoder generated based on the first PMI. In some instances, the first precoder may include a precoding matrix similar to the precoding matrix 310 $W^{(1)}$ of FIG. 3. In some other instances, the first precoder may include a precoding matrix similar to the precoding matrix 410 $W^{(1)}$ of FIG. 4. For example, the TRP 804 may generate the first wideband matrix based on the codeword 942, the first coefficient matrix based on the bitmap 948 and the first coefficients 946, and the first frequency compression matrix based on the codeword 944. The TRP 804 may apply the generated the first wideband matrix, the first coefficient matrix, and the first frequency compression matrix to generate the first UL communication signal. In some instances, the TRP 804 may utilize one or more components, such as the processor 702, the PMI module 708, the transceiver 710, the modem 712, and the one or more antennas 716, to transmit the first UL communication signal.

At action 880, the TRP 806 may transmit a second UL communication signal to the UE 808. The TRP 806 may generate the second UL communication using a second precoder generated based on the second PMI. In some instances, the second precoder may include a precoding matrix similar to the precoding matrix 320 $W^{(2)}$ of FIG. 3. In some other instances, the second precoder may include a precoding matrix similar to the precoding matrix 420 $W^{(2)}$ of FIG. 4. In some instances, the TRP 806 may utilize one or more components, such as the processor 702, the PMI module 708, the transceiver 710, the modem 712, and the one or more antennas 716, to transmit the second UL communication signal.

Similarly, when the second PMI corresponds to the second PMI feedback component 950 shown in the method 900 The TRP 806 may generate the second wideband matrix based on the codeword 952, the second coefficient matrix based on the bitmap 958 and the second coefficients 956, and the second frequency compression matrix based on the codeword 954. The TRP 806 may apply the generated the second wideband matrix, the second coefficient matrix, and the second frequency compression matrix to generate the second UL communication signal.

Figure 10:
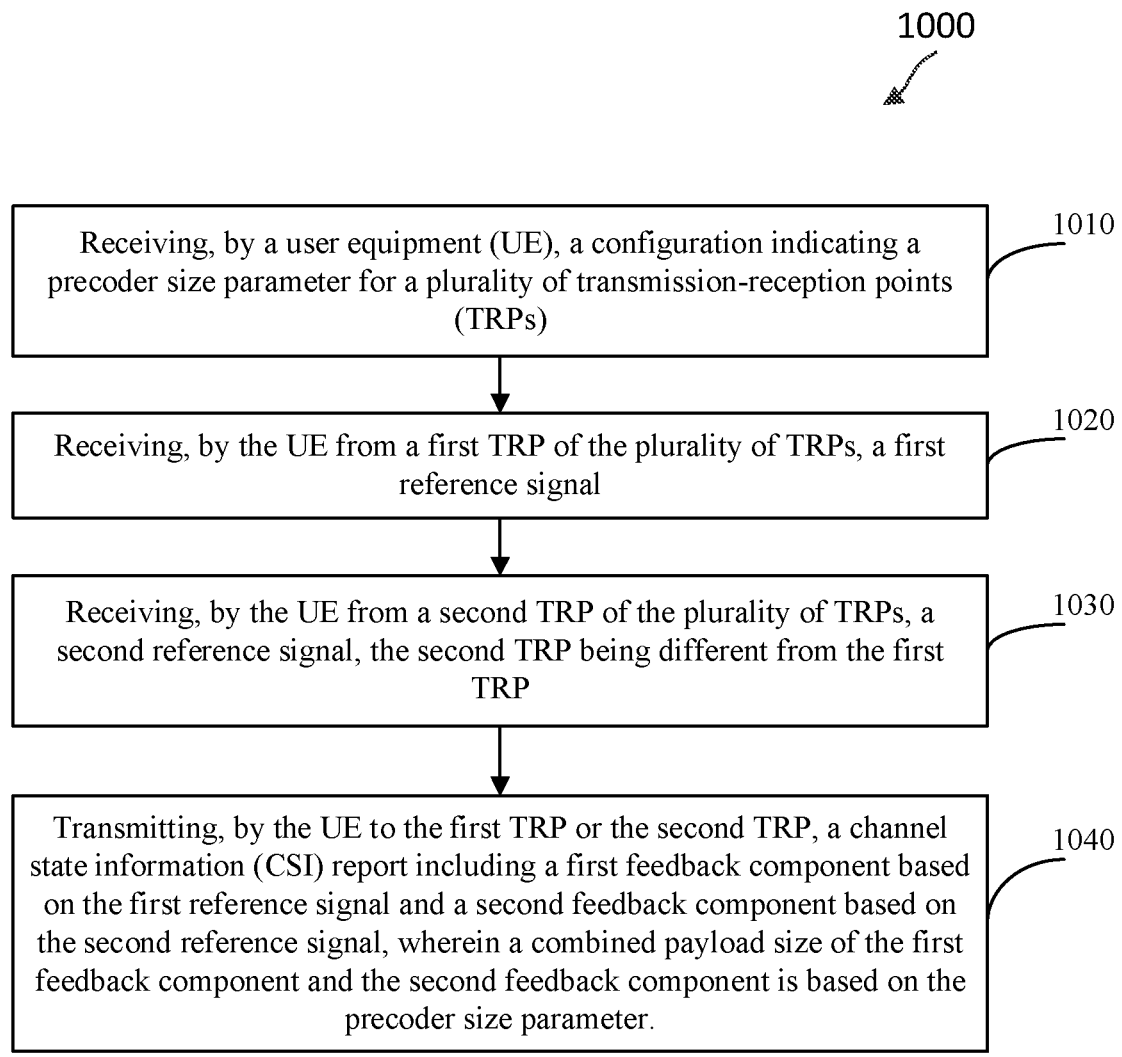
FIG. 10 is a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the PMI module 508, the transceiver 510, the modem 512, and the one or more antennas 516, to execute the steps of method 1000. The method 1000 may employ similar mechanisms as discussed above in FIGS. 3-9. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a UE (e.g., the UEs 115, 215, and/or 500) receives a configuration indicating a precoder size parameter for a plurality of TRPs (e.g., the TRPs 210, 220, 700, 804, and/or 806). In some instances, the UE may utilize one or more components, such as the processor 502, the PMI module 508, the transceiver 510, the modem 512, and the one or more antennas 516, to receive the configuration indicating the precoder size parameter for the plurality of TRPs.

In some aspects, the precoder size parameter is associated with a first precoder of the first TRP and a second precoder of the second TRP. In some instances, the first precoder may include a precoding matrix similar to the precoding matrix 310 $W^{(1)}$ and the second precoder may include a precoding matrix similar to the precoding matrix 320 $W^{(2)}$ as discussed above with reference to FIG. 3. In some other instances, the first precoder may include a precoding matrix similar to the precoding matrix 410 $W^{(1)}$ and the second precoder may include a precoding matrix similar to the precoding matrix 420 $W^{(2)}$ as discussed above with reference to FIG. 4.

In some aspects, the precoder size parameter may be associated with at least one of a quantity of spatial domain components, a quantity of frequency domain components, a parameter associated with a quantity of coefficients, or a quantization level for the coefficients. In some instances, the quantity of spatial domain components may be a total quantity of spatial domain components (e.g., $L_{total}$) for all TRPs as discussed above in the configuration 330 with reference to FIGS. 3 and 4. In some other instances, the quantity of spatial domain components may be a quantity of per-TRP spatial domain components (e.g., $L^{(1)}$ and $L^{(2)}$) as discussed above in the configuration 340 with reference to FIGS. 3 and 4. In some instances, the quantity of frequency domain components may be a total quantity of spatial domain components (e.g., $M_{total}$) for all TRPs as discussed above in the configuration 432 with reference to FIG. 4. In some other instances, the quantity of frequency domain components may be a quantity of per-TRP frequency domain components (e.g., $M^{(1)}$ and $M^{(2)}$) as discussed above in the configuration 442 with reference to FIG. 4. In some instances, the parameter associated with the quantity of coefficients may be a common parameter (e.g., $\beta_{common}$) for controlling the quantity of coefficients to be report for all TRPs as discussed above in the configuration 434 with reference to FIG. 4. In some other instances, the parameter associated with the quantity of coefficients may be a parameter (e.g., $\beta^{(1)}$ and $\beta^{(2)}$) for controlling the quantity of coefficients to be reported for each TRP as discussed above in the configuration 444 with reference to FIG. 4. In some instances, the quantization level for the coefficients may be a total quantity of per-coefficient quantization bits (e.g., $Q_{total}$) for all TRP as discussed above in the configuration 436 with reference to FIG. 4. In some other instances, the quantization level for the coefficients may be a quantity of per-TRP, per-coefficient quantization bits (e.g., $Q^{(1)}$ and $Q^{(2)}$) as discussed above in the configuration 446 with reference to FIG. 4.

At block 1020, the UE receives, from a first TRP of the plurality of TRPs, a first reference signal (e.g., the CSI-RS 214). In some instances, the UE may utilize one or more components, such as the processor 502, the PMI module 508, the transceiver 510, the modem 512, and the one or more antennas 516, to receive the first reference signal.

At block 1030, the UE receives, from a second TRP of the plurality of TRPs, a second reference signal (e.g., the CSI-RS 224), the second TRP being different from first TRP. In some instances, the UE may utilize one or more components, such as the processor 502, the PMI module 508, the transceiver 510, the modem 512, and the one or more antennas 516, to receive the second reference signal.

At block 1040, the UE transmits, to the first TRP or the second TRP, a CSI report (e.g., the report 230) including a first feedback component based on the first reference signal and a second feedback component based on the second reference signal, where a combined payload size of the first feedback component and the second feedback component is based on the precoder size parameter. In some instances, the UE may utilize one or more components, such as the processor 502, the PMI module 508, the transceiver 510, the modem 512, and the one or more antennas 516, to transmit the CSI report.

In some instances, the first feedback component is associated with a first Type II CSI codebook associated with the first TRP, and the second feedback component is associated with a second Type II CSI codebook associated with the second TRP.

Figure 11:
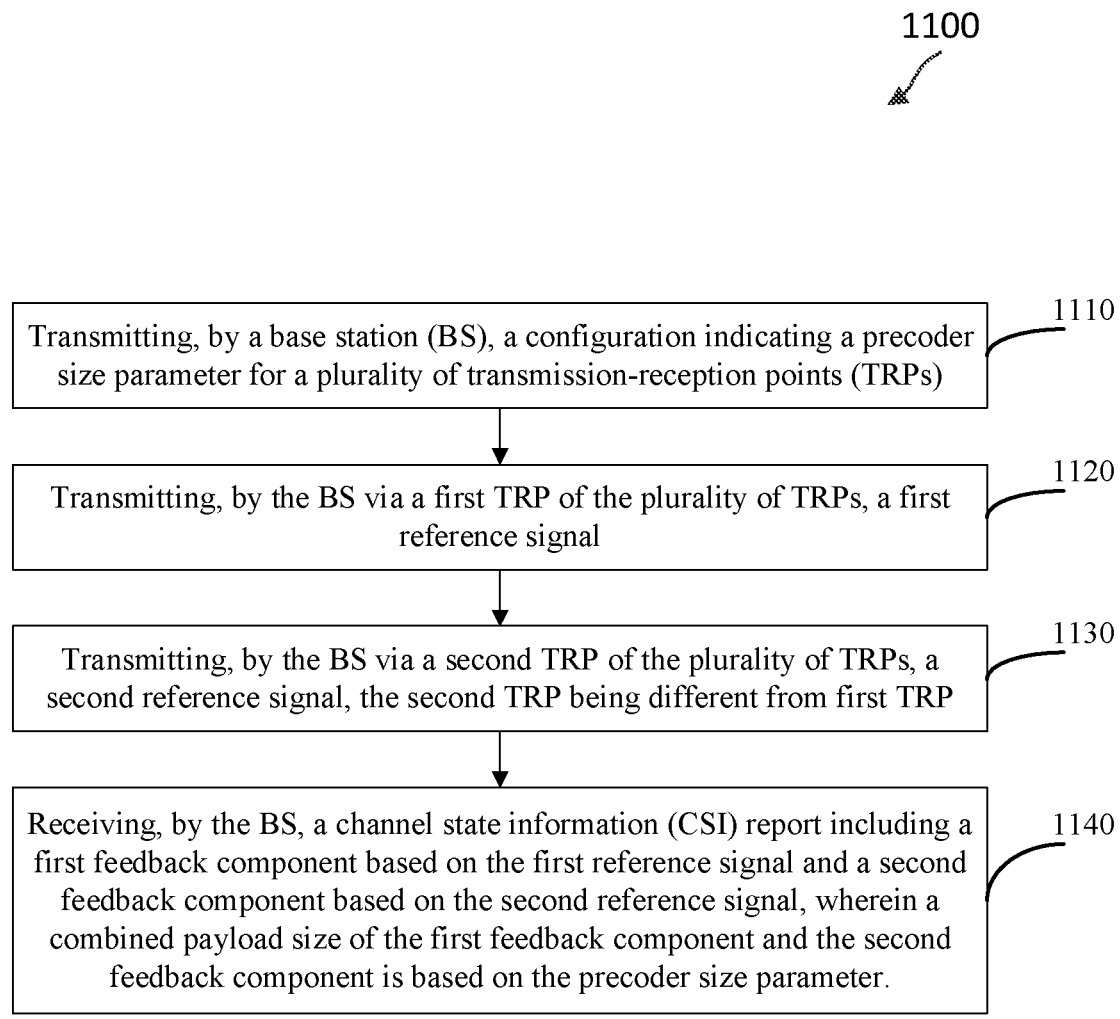
FIG. 11 is a flow diagram of a wireless communication method according to some aspects of the present disclosure.

FIG. 11 is a flow diagram of a wireless communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the BSs 105, 205, and/or 600, may utilize one or more components, such as the processor 602, the memory 604, the PMI module 608, the transceiver 610, the modem 612, and the one or more antennas 616, to execute the steps of method 1100. Alternatively, a wireless communication device, such as the TRPs 210, 220, 700, 804, and/or 806, may utilize one or more components, such as the processor 702, the memory 704, the PMI module 708, the transceiver 710, the modem 712, and the one or more antennas 716, to execute the steps of method 1100. The method 1100 may employ similar mechanisms as discussed above in FIGS. 3-9. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, a BS (e.g., the BSs 205, 205, and/or 600) transmits a configuration indicating a precoder size parameter for a plurality of TRPs (e.g., the TRPs 210, 220, 700, 804, and/or 806). In some instances, the BS may utilize one or more components, such as the processor 602 or 702, the PMI module 608 or 708, the transceiver 610 or 710, the modem 612 or 712, and the one or more antennas 616 or 716, to receive the configuration indicating the precoder size parameter for the plurality of TRPs.

In some aspects, the precoder size parameter is associated with a first precoder of the first TRP and a second precoder of the second TRP. In some instances, the first precoder may include a precoding matrix similar to the precoding matrix 310 $W^{(1)}$ and the second precoder may include a precoding matrix similar to the precoding matrix 320 $W^{(2)}$ as discussed above with reference to FIG. 3. In some other instances, the first precoder may include a precoding matrix similar to the precoding matrix 410 $W^{(1)}$ and the second precoder may include a precoding matrix similar to the precoding matrix 420 $W^{(2)}$ as discussed above with reference to FIG. 4.

In some aspects, the precoder size parameter may be associated with at least one of a quantity of spatial domain components, a quantity of frequency domain components, a parameter associated with a quantity of coefficients, or a quantization level for the coefficients. In some instances, the quantity of spatial domain components may be a total quantity of spatial domain components (e.g., $L_{total}$) for all TRPs as discussed above in the configuration 330 with reference to FIGS. 3 and 4. In some other instances, the quantity of spatial domain components may be a quantity of per-TRP spatial domain components (e.g., $L^{(1)}$ and $L^{(2)}$) as discussed above in the configuration 340 with reference to FIGS. 3 and 4. In some instances, the quantity of frequency domain components may be a total quantity of spatial domain components (e.g., $M_{total}$) for all TRPs as discussed above in the configuration 432 with reference to FIG. 4. In some other instances, the quantity of frequency domain components may be a quantity of per-TRP frequency domain components (e.g., $M^{(1)}$ and $M^{(2)}$) as discussed above in the configuration 442 with reference to FIG. 4. In some instances, the parameter associated with the quantity of coefficients may be a common parameter (e.g., $\beta_{common}$) for controlling the quantity of coefficients to be report for all TRPs as discussed above in the configuration 434 with reference to FIG. 4. In some other instances, the parameter associated with the quantity of coefficients may be a parameter (e.g., $\beta^{(1)}$ and $\beta^{(2)}$) for controlling the quantity of coefficients to be reported for each TRP as discussed above in the configuration 444 with reference to FIG. 4. In some instances, the quantization level for the coefficients may be a total quantity of per-coefficient quantization bits (e.g., $Q_{total}$) for all TRP as discussed above in the configuration 436 with reference to FIG. 4. In some other instances, the quantization level for the coefficients may be a quantity of per-TRP, per-coefficient quantization bits (e.g., $Q^{(1)}$ and $Q^{(2)}$) as discussed above in the configuration 446 with reference to FIG. 4.

At block 1120, the BS transmits via a first TRP of the plurality of TRPs, a first reference signal (e.g., the CSI-RS 214). In some instances, the BS may utilize one or more components, such as the processor 602 or 702, the PMI module 608 or 708, the transceiver 610 or 710, the modem 612 or 712, and the one or more antennas 616 or 716, to receive the first reference signal.

At block 1130, the BS transmits via a second TRP of the plurality of TRPs, a second reference signal (e.g., the CSI-RS 224), the second TRP being different from first TRP. In some instances, the BS may utilize one or more components, such as the processor 602 or 702, the PMI module 608 or 708, the transceiver 610 or 710, the modem 612 or 712, and the one or more antennas 616 or 716, to receive the second reference signal.

At block 1140, the BS receives, via the first TRP or the second TRP, a CSI report (e.g., the report 230) including a first feedback component based on the first reference signal and a second feedback component based on the second reference signal, where a combined payload size of the first feedback component and the second feedback component is based on the precoder size parameter. In some instances, the BS may utilize one or more components, such as the processor 602 or 702, the PMI module 608 or 708, the transceiver 610 or 710, the modem 612 or 712, and the one or more antennas 616 or 716, to transmit the CSI report.

In some instances, the first feedback component is associated with a first Type II CSI codebook associated with the first TRP, and the second feedback component is associated with a second Type II CSI codebook associated with the second TRP.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    receiving a configuration indicating a precoder size parameter for a plurality of transmission-reception points (TRPs) comprising a first TRP and a second TRP, wherein the receiving the configuration includes receiving the precoder size parameter associated with a first precoder of the first TRP and a second precoder of the second TRP, and wherein the precoder size parameter is further associated with at least one of a quantity of spatial domain components, a quantity of frequency domain components, a parameter associated with a quantity of coefficients, or a quantization level for the coefficients;
    receiving from a first TRP of the plurality of TRPs, a first reference signal; receiving
    from a second TRP of the plurality of TRPs, a second reference signal, the second TRP being different from first TRP; and
    transmitting to the first TRP or the second TRP, a channel state information (CSI) report including a first feedback component based on the first reference signal and a second feedback component based on the second reference signal, wherein a combined payload size of the first feedback component and the second feedback component is based on the precoder size parameter.

2. The method of claim 1, wherein the at least one of the quantity of spatial domain components, the quantity of frequency domain components, the parameter associated with the quantity of coefficients, or the quantization level for the coefficients is based on a quantity of TRPs in the plurality of TRPs.

3. The method of claim 1, further comprising:
    determining at least one of a first quantity of spatial domain components for the first precoder or a second quantity of spatial domain component for the second precoder based on the quantity of spatial domain components indicated by the configuration, wherein at least one of the first feedback component is based on the first quantity of spatial domain component or the second feedback component is based on the second quantity of spatial domain components.

4. The method of claim 1, further comprising:
    determining at least one of a first quantity of frequency domain components for the first precoder or a second quantity of frequency domain component for the second precoder based on the quantity of frequency domain components indicated by the configuration,
    wherein at least one of the first feedback component is based on the first quantity of frequency domain components or the second feedback component is based on the second quantity of frequency domain components.

5. The method of claim 1, further comprising:
    determining at least one of a first parameter associated with a first quantity of coefficients for the first precoder or a second parameter associated with a second quantity of coefficients for the second precoder based on the quantity of coefficients indicated by the configuration,
    wherein at least one of the first feedback component is based on the first parameter associated with the first quantity of coefficients or the second feedback component is based on the second parameter associated with the second quantity of coefficients.

6. The method of claim 1, further comprising:
determining at least one of a first quantization level for first coefficients of the first precoder or a second quantization level for second coefficients of the second precoder based on the quantization level indicated by the configuration,
wherein at least one of the first feedback component is based on the first quantization level for the first coefficients or the second feedback component is based on the second quantization level for the second coefficients.

7. The method of claim 1, wherein the receiving the configuration includes receiving:
a first precoder size parameter associated with the first TRP; and a
second precoder size parameter associated with the second TRP.

8. The method of claim 7, wherein the receiving the configuration includes receiving:
the first precoder size parameter including a first value; and
the second precoder size parameter including a second value different than the first value.

9. The method of claim 7, wherein the receiving the configuration includes receiving:
the first precoder size parameter associated with a first quantity of spatial domain components associated with a precoder of the first TRP; and
the second precoder size parameter associated with a second quantity of spatial domain components associated with a precoder of the second TRP.

10. The method of claim 7, wherein the receiving the configuration includes receiving:
the first precoder size parameter associated with a first quantity of frequency domain components associated with a precoder of the first TRP; and
the second precoder size parameter associated with a second quantity of frequency domain components associated with a precoder of the second TRP.

11. The method of claim 7, wherein the receiving the configuration includes receiving:
the first precoder size parameter associated with a first quantity of coefficients associated with a precoder of the first TRP; and
the second precoder size parameter associated with a second quantity of coefficients associated with a precoder of the second TRP.

12. The method of claim 7, wherein the receiving the configuration includes receiving:
the first precoder size parameter associated with a first quantization level of coefficients associated with a precoder of the first TRP; and
the second precoder size parameter associated with a second quantization level of coefficients associated with a precoder of the second TRP.

13. The method of claim 1, wherein the first feedback component is associated with a first Type II CSI codebook associated with the first TRP, and wherein the second feedback component is associated with a second Type II CSI codebook associated with the second TRP.

14. A method of wireless communication performed by a base station (BS), the method comprising:
transmitting a configuration indicating a precoder size parameter for a plurality of transmission-reception points (TRPs) comprising a first TRP and a second TRP, wherein the transmitting the configuration includes transmitting the precoder size parameter associated with a first precoder of the first TRP and a second precoder of the second TRP, and wherein the precoder size parameter is further associated with at least one of a quantity of spatial domain components, a quantity of frequency domain components, a parameter associated with a quantity of coefficients, or a quantization level for the coefficients;
transmitting via a first TRP of the plurality of TRPs, a first reference signal;
transmitting via a second TRP of the plurality of TRPs, a second reference signal, the second TRP being different from first TRP; and
receiving a channel state information (CSI) report including a first feedback component based on the first reference signal and a second feedback component based on the second reference signal, wherein a combined payload size of the first feedback component and the second feedback component is based on the precoder size parameter.

15. A user equipment (UE) comprising: a memory;
a transceiver; and
at least one processor coupled to the memory and the transceiver, wherein the UE is configured to:
receive a configuration indicating a precoder size parameter for a plurality of transmission-reception points (TRPs);
receive, from a first TRP of the plurality of TRPs, a first reference signal;
receive, from a second TRP of the plurality of TRPs, a second reference signal, the second TRP being different from first TRP;
receive the precoder size parameter associated with a first precoder of the first TRP and a second precoder of the second TRP, and wherein the precoder size parameter is further associated with at least one of a quantity of spatial domain components, a quantity of frequency domain components, a parameter associated with a quantity of coefficients, or a quantization level for the coefficients; and
transmit, to the first TRP or the second TRP, a channel state information (CSI) report including a first feedback component based on the first reference signal and a second feedback component based on the second reference signal, wherein a combined payload size of the first feedback component and the second feedback component is based on the precoder size parameter.

16. The UE of claim 15, wherein the at least one of the quantity of spatial domain components, the quantity of frequency domain components, the parameter associated with the quantity of coefficients, or the quantization level for the coefficients is based on a quantity of TRPs in the plurality of TRPs.

17. The UE of claim 15, wherein the UE is further configured to:
determine at least one of a first quantity of spatial domain components for the first precoder or a second quantity of spatial domain component for the second precoder based on the quantity of spatial domain components indicated by the configuration,
wherein at least one of the first feedback component is based on the first quantity of spatial domain component or the second feedback component is based on the second quantity of spatial domain components.

18. The UE of claim 15, wherein the UE is further configured to:
  determine at least one of a first quantity of frequency domain components for the first precoder or a second quantity of frequency domain component for the second precoder based on the quantity of frequency domain components indicated by the configuration,
  wherein at least one of the first feedback component is based on the first quantity of frequency domain components or the second feedback component is based on the second quantity of frequency domain components.

19. The UE of claim 15, wherein the UE is further configured to:
  determine at least one of a first parameter associated with a first quantity of coefficients for the first precoder or a second parameter associated with a second quantity of coefficients for the second precoder based on the quantity of coefficients indicated by the configuration,
  wherein at least one of the first feedback component is based on the first parameter associated with the first quantity of coefficients or the second feedback component is based on the second parameter associated with the second quantity of coefficients.

20. The UE of claim 15, wherein the UE is further configured to:
  determine at least one of a first quantization level for first coefficients of the first precoder or a second quantization level for second coefficients of the second precoder based on the quantization level indicated by the configuration,
  wherein at least one of the first feedback component is based on the first quantization level for the first coefficients or the second feedback component is based on the second quantization level for the second coefficients.

21. The UE of claim 15, wherein the UE is further configured to receive:
  a first precoder size parameter associated with the first TRP; and
  a second precoder size parameter associated with the second TRP.

22. The UE of claim 21, wherein the UE is further configured to receive:
  the first precoder size parameter including a first value; and
  the second precoder size parameter including a second value different than the first value.

23. The UE of claim 21, wherein the UE is further configured to receive:
  the first precoder size parameter associated with a first quantity of spatial domain components associated with a precoder of the first TRP; and
  the second precoder size parameter associated with a second quantity of spatial domain components associated with a precoder of the second TRP.

24. The UE of claim 21, wherein the UE is further configured to receive:
  the first precoder size parameter associated with a first quantity of frequency domain components associated with a precoder of the first TRP; and
  the second precoder size parameter associated with a second quantity of frequency domain components associated with a precoder of the second TRP.

25. The UE of claim 21, wherein the UE is further configured to receive:
  the first precoder size parameter associated with a first quantity of coefficients associated with a precoder of the first TRP; and
  the second precoder size parameter associated with a second quantity of coefficients associated with a precoder of the second TRP.

26. The UE of claim 21, wherein the UE is further configured to receive:
  the first precoder size parameter associated with a first quantization level of coefficients associated with a precoder of the first TRP; and
  the second precoder size parameter associated with a second quantization level of coefficients associated with a precoder of the second TRP.

27. A base station (BS) comprising: a memory;
  a transceiver; and
  at least one processor coupled to the memory and the transceiver, wherein the BS is configured to:
    transmit a configuration indicating a precoder size parameter for a plurality of transmission-reception points (TRPs);
    transmit, via a first TRP of the plurality of TRPs, a first reference signal;
    transmit, via a second TRP of the plurality of TRPs, a second reference signal, the second TRP being different from the first TRP;
    transmit the precoder size parameter associated with a first precoder of the first TRP and a second precoder of the second TRP, and wherein the precoder size parameter is further associated with at least one of a quantity of spatial domain components, a quantity of frequency domain components, a parameter associated with a quantity of coefficients, or a quantization level for the coefficients; and
    receive a channel state information (CSI) report including a first feedback component based on the first reference signal and a second feedback component based on the second reference signal, wherein a combined payload size of the first feedback component and the second feedback component is based on the precoder size parameter.

* * * * *